United States Patent
Grenov et al.

(10) Patent No.: US 11,057,599 B2
(45) Date of Patent: Jul. 6, 2021

(54) IMAGE ANALYSIS SYSTEM AND METHOD

(71) Applicant: THERMO ELECTRON SCIENTIFIC INSTRUMENTS LLC, Madison, WI (US)

(72) Inventors: Alexander Grenov, Madison, WI (US); Damian W. Ashmead, Middletown, DE (US); Kevin K. Kim, Madison, WI (US); Francis J. Deck, Madison, WI (US); Chris Xavier Kauffold, Madison, WI (US)

(73) Assignee: Thermo Electron Scientific Instruments LLC, Madison, WI (US)

( * ) Notice: Subject to any disclaimer, the term of this patent is extended or adjusted under 35 U.S.C. 154(b) by 0 days.

(21) Appl. No.: 16/814,646

(22) Filed: Mar. 10, 2020

(65) Prior Publication Data

US 2020/0213569 A1 Jul. 2, 2020

Related U.S. Application Data

(62) Division of application No. 15/262,191, filed on Sep. 12, 2016, now Pat. No. 10,630,951.

(Continued)

(51) Int. Cl.
*H04N 9/64* (2006.01)
*G06K 9/32* (2006.01)
(Continued)

(52) U.S. Cl.
CPC ............. *H04N 9/646* (2013.01); *G01B 11/24* (2013.01); *G01J 3/2823* (2013.01);
(Continued)

(58) Field of Classification Search
CPC ................................ H04N 9/646; G01B 11/24
See application file for complete search history.

(56) References Cited

U.S. PATENT DOCUMENTS 6,628,382 B2    9/2003   Robertson
6,809,826 B2 *   10/2004   Robertson .............. B82Y 15/00
                                                          356/246

(Continued)

FOREIGN PATENT DOCUMENTS

CN        1120163 A      4/1996
CN     102341690 B    10/2013

(Continued)

OTHER PUBLICATIONS

Canny, "A Computational Approach to Edge Detection", IEEE Trans. Pattern Analysis and Machine Intelligence, 8 (6), 679-698, 1986.

(Continued)

*Primary Examiner* — Santiago Garcia
(74) *Attorney, Agent, or Firm* — William R. McCarthy, III

(57) ABSTRACT

An image analysis system includes a video camera that collects YUV color images of a liquid sample disposed between a capital and a pedestal, the color images being collected while a light source shines light through an optical beam path between the capital and the pedestal, and a processor adapted to i) obtain from the YUV color images a grayscale component image and a light scatter component image, and ii) obtain at least one binary image of the grayscale component image and at least one binary image of the light scatter component image.

18 Claims, 24 Drawing Sheets

Related U.S. Application Data

(60) Provisional application No. 62/306,786, filed on Mar. 11, 2016, provisional application No. 62/219,444, filed on Sep. 16, 2015.

(51) Int. Cl.

| | | |
|---|---|---|
| *G01J 3/28* | (2006.01) | |
| *G01B 11/24* | (2006.01) | |
| *G01N 21/88* | (2006.01) | |
| *G01N 21/47* | (2006.01) | |
| *G01N 21/51* | (2006.01) | |
| *G01N 21/25* | (2006.01) | |
| *G01N 21/03* | (2006.01) | |

(52) U.S. Cl.
CPC ........... *G01N 21/251* (2013.01); *G01N 21/47* (2013.01); *G01N 21/51* (2013.01); *G01N 21/88* (2013.01); *G06K 9/3233* (2013.01); *G01N 2021/035* (2013.01); *G01N 2201/12* (2013.01)

(56) References Cited

U.S. PATENT DOCUMENTS

| | | | | |
|---|---|---|---|---|
| 7,375,815 | B2* | 5/2008 | Kralik | G01N 21/03 356/245 |
| 7,397,036 | B2* | 7/2008 | Robertson | G01N 21/645 250/368 |
| 7,808,641 | B2* | 10/2010 | Salerno | G01N 21/59 356/440 |
| 7,969,575 | B2* | 6/2011 | Zuo | G01N 21/5907 356/432 |
| 8,189,199 | B2* | 5/2012 | Robertson, Jr. | G01N 33/1806 356/440 |
| 8,208,145 | B2* | 6/2012 | Large | G01N 21/31 356/436 |
| 8,223,338 | B2* | 7/2012 | Robertson, Jr. | G01N 21/0303 356/440 |
| 8,570,521 | B2* | 10/2013 | Chumachenko | G01N 21/0303 356/440 |
| 9,170,191 | B2* | 10/2015 | Coffin | G01J 3/0202 |
| 9,341,515 | B2* | 5/2016 | Schulte | G01J 3/0229 |
| 9,502,227 | B2* | 11/2016 | Masujima | G01N 27/62 |
| 10,149,958 | B1 | 12/2018 | Tran | G16H 20/30 |
| 2002/0154299 | A1 | 10/2002 | Robertson | |
| 2006/0158546 | A1* | 7/2006 | Hirai | H04N 5/2254 348/335 |
| 2008/0285853 | A1* | 11/2008 | Bressan | G06T 5/40 382/169 |
| 2011/0235034 | A1* | 9/2011 | Fukuda | G01J 3/02 356/319 |
| 2012/0206727 | A1* | 8/2012 | Schulte | G02B 21/0032 356/402 |
| 2013/0155133 | A1* | 6/2013 | Ikeda | B05B 13/04 347/7 |
| 2013/0167621 | A1* | 7/2013 | Lin | B01L 3/502792 73/61.41 |
| 2014/0097510 | A1* | 4/2014 | Sugawa | G01J 3/2823 257/432 |
| 2016/0022850 | A1* | 1/2016 | Tsai | A61L 2/0088 422/29 |
| 2016/0116416 | A1* | 4/2016 | Wang | G01N 21/718 356/318 |
| 2016/0187760 | A1* | 6/2016 | Kim | G02F 1/1341 349/139 |
| 2016/0282352 | A1* | 9/2016 | Martino | G01N 33/574 |
| 2017/0220000 | A1* | 8/2017 | Ozcan | H04N 5/23238 |
| 2018/0134417 | A1* | 5/2018 | Drexler | B64G 1/002 |
| 2018/0134811 | A1* | 5/2018 | Adden | C08J 3/122 |
| 2018/0134812 | A1* | 5/2018 | Adden | C08B 11/02 |
| 2018/0252701 | A1* | 9/2018 | Rhodes | G01N 21/78 |
| 2018/0321068 | A1* | 11/2018 | Meribout | G01F 1/712 |
| 2018/0354683 | A1* | 12/2018 | Bludorn | B42D 15/0053 |

FOREIGN PATENT DOCUMENTS

| | | |
|---|---|---|
| CN | 104487816 A | 4/2015 |
| JP | S63270381 A | 11/1988 |
| JP | S63307186 A | 12/1988 |
| JP | H02242405 A | 9/1990 |
| JP | H0348140 A | 3/1991 |
| JP | H04359106 A | 12/1992 |
| JP | H09185711 A | 7/1997 |
| JP | H10508709 A | 8/1998 |
| JP | 2000036032 A | 2/2000 |
| JP | 2001197305 A | 7/2001 |
| JP | 2007510993 A | 4/2007 |
| JP | 2007189577 A | 7/2007 |
| JP | 2007226334 A | 9/2007 |
| JP | 2008530554 A | 8/2008 |
| JP | 2010009480 A | 1/2010 |
| JP | 2011221603 A | 11/2011 |
| JP | 2012504769 A | 2/2012 |
| JP | 2012519839 A | 8/2012 |
| JP | 2015103906 A | 6/2015 |
| JP | 2015522177 A | 8/2015 |
| WO | WO-0114855 A1 | 3/2001 |
| WO | WO-2006086459 A2 | 8/2006 |
| WO | WO-2010100502 A1 | 9/2010 |
| WO | WO-2014100715 A2 | 6/2014 |
| WO | WO-2015069936 A2 | 5/2015 |

OTHER PUBLICATIONS

Caselles et al., "Geodesic Active Contours", International Journal of Computer Vision, 22{1 ), 61-79, 1997.

CN Office action dated Oct. 22, 2019, to CN Patent Application No. 201680049333.0.

Gonzalez and Woods, Digital Image Processing, 2nd Ed., Prentice Hall, pp. 528-536, 578, and 595, 2002.

Kass, M., et al., "Snakes: Active contour models," International Journal of Computer Vision, 1 {4), 321, 1988.

Ku, C. and Prince, J.L., "Snakes, Shapes, and Gradient Vector Flow," IEEE Transactions on Image Processing, 7 (3), 359-369, 1998.

Pla, "Recognition of Partial Circular Shapes from Segmented Contours," Computer Vision and Image Understanding, 63{2), 334-342, 1996.

Japanese Office Action English language translation for Patent Application No. 2018-513670, dated Aug. 31, 2020, 4 pages.

\* cited by examiner

IMAGE ANALYSIS SYSTEM AND METHOD

CROSS-REFERENCE TO RELATED APPLICATIONS

This application is a division of U.S. application Ser. No. 15/262,191, filed Sep. 12, 2016, which claims priority to U.S. provisional patent applications Ser. No. 62/219,444, filed Sep. 16, 2015 and Ser. No. 62/306,786, filed Mar. 11, 2016, entitled IMAGE ANALYSIS SYSTEM AND METHOD, which are incorporated herein by reference in their entireties.

FIELD OF THE INVENTION

The invention is generally related to analysis of an image of a column of a liquid sample.

BACKGROUND

Liquids, mixtures, solutions and reacting mixtures are often characterized using optical techniques such as spectrophotometry. In order to characterize samples of these liquids, the liquid is usually contained in a vessel referred to as a cell or cuvette, two or more of whose sides are of optical quality and permit the passage of those wavelengths needed to characterize the liquid contained therein. When dealing with very small sample volumes of, for example, from 1 to 2 microliters, it is difficult to create cells or cuvettes small enough to be filled and permit the industry standard 1 cm optical path to be used. It is also difficult and/or time consuming to clean these cells or cuvettes for use with another sample.

As shown in FIG. 1A, micro-volume UV/Vis spectrophotometers described, for example, in U.S. Pat. No. 6,628,382 B2 issued to Robertson on Sep. 30, 2003, the disclosure of which is hereby incorporated by reference in its entirety (however, where anything in the incorporated reference contradicts anything stated in the present application, the present application prevails), measure the absorbance of microliter amounts of liquid samples via a sample retention technology which enables containing a liquid sample by its surface tension between surfaces 2 and 7. The liquid sample forms a column 9 between a light receiving sample interface 7 typically coupled to an optical fiber 11, and a light transmitting sample interface 2, which is typically coupled to another optical fiber 6. The upper 2 and lower 7 sample interfaces can be moved in relation to one another to create multiple known path lengths that are typically less than or equal to 1 mm. Light 3 from a light source coming through the fiber 6 contained in and flush with surface 2 (also referenced herein as the upper sample interface, or capital) radiates downward through the liquid sample column 9 and is collected by the fiber 11 in the lower surface 7 of the lower sample interface 4 (also referenced herein as the pedestal) and sent on to the analysis spectrometer for absorbance measurements. The capital and the pedestal are the upper and lower members of a column, respectively.

The placement of the liquid sample is achieved by the user manually pipetting a sample (typically a microliter or two) directly onto the lower sample interface. The absorbance of the sample is measured by taking the negative log of the ratio of the amount of light ($I_o$) transmitted through the system in the absence of the sample and the amount of light (I) transmitted through the system when the sample is present in the sampling interface. Under normal conditions, the amount of light transmitted through the system when the sample is present in the sampling interface is directly proportional to the path length and the concentration of the sample, in accordance with the Beer-Lambert law.

Occasionally, however, a condition exists where the amount of light transmitted through the system is affected by physical factors, including broken or misshapen sample columns, misplacement of the sample on the interface, and bubbles in the sample. In most cases, these factors are caused by user pipetting errors. In these cases, the light from the light transmitting interface is both absorbed by the sample and either scattered or skewed from its original beam path resulting in an amount of light entering the light receiving interface that is no longer directly proportional to the path length and the concentration of the sample. The end result is an inaccurate photometric measurement of the liquid sample of interest.

Detection of these conditions is difficult, due in part to the very small path length. Therefore, there is a need for an image analysis system for image analysis of the column of the liquid sample.

SUMMARY

In one embodiment, an image analysis system includes a video camera that collects YUV color images of a liquid sample disposed between a capital and a pedestal, the color images being collected while a light source shines light through an optical beam path between the capital and the pedestal, and a processor adapted to i) obtain from the YUV color images a grayscale component image and a light scatter component image, and ii) obtain at least one binary image of the grayscale component image and at least one binary image of the light scatter component image. The processor can be further adapted to detect a region-of-interest that includes a location of the capital and the pedestal from the grayscale component image. The image analysis system can include a homogeneous reflective background, such as a light gray homogeneous reflective background, for example, a 82% brightness and 12% gloss light gray homogeneous reflective background.

In some embodiments, the video camera can collect the YUV color images from a camera video stream. In those specific embodiments, the processor can be further adapted to obtain the grayscale component image from an average of Y components of the YUV color images, and the light scatter component image from a maximum U component of the YUV color images.

In certain embodiments, the at least one binary image of the grayscale component image can include a first binary image of the grayscale component image obtained from applying an upper dynamic threshold and a lower dynamic threshold obtained from an interpolation between left and right background variation thresholds in the grayscale component image. In those specific embodiments, the at least one binary image of the grayscale component image can include a second binary image of a grayscale isotropic gradient image, the grayscale isotropic gradient image obtained using the grayscale component image and a static threshold based on isotropic gradient image background noise statistics. In some of those specific embodiments, the at least one binary image of the grayscale component image can include a composite binary image obtained from a combination of the first and second binary images. The processor can be further adapted to detect location of a column of the liquid sample and location of the optical beam path from the composite binary image. The processor can also be further adapted to detect skewedness and/or integrity of the column of the liquid sample from the composite binary image.

In another embodiment, a method of analyzing an image includes collecting YUV color images of a liquid sample disposed between a capital and a pedestal, the color images being collected while a light source shines light through an optical beam path between the capital and the pedestal. The method further includes obtaining from the YUV color images a grayscale component image and a light scatter component image, and obtaining at least one binary image of the grayscale component image and at least one binary image of the light scatter component image. The method then includes detecting a region-of-interest that includes a location of the capital and the pedestal from the grayscale component image, and reporting an image analysis summary to a display. Collecting YUV color images can include collecting the YUV color images from a camera video stream. Obtaining the grayscale component image can include averaging Y components of the YUV color images. Obtaining the light scatter component image can include selecting a maximum U component of the YUV color images. Processing of the grayscale component image, light scatter component image, and binary images obtained therefrom is described above.

In still another embodiment, an image analysis system includes a video camera that collects images of a liquid sample disposed between a capital and a pedestal, the images being collected while a light source shines light through an optical beam path between the capital and the pedestal, and a processor adapted to detect any bubble in a column of the liquid sample using the images. In any of the embodiments described herein, an example of the light source shining light through the optical beam path between the capital and the pedestal is the light source shining light across the optical beam path between the capital and the pedestal. The images can be YUV color images, and the processor can be further adapted to i) obtain from the YUV color images a grayscale component image and a light scatter component image, and ii) obtain at least one binary image of the grayscale component image and at least one binary image of the light scatter component image. The at least one binary image of the grayscale component image can include a first binary image of the grayscale component image obtained from applying an upper dynamic threshold and a lower dynamic threshold obtained from an interpolation between left and right background variation thresholds in the grayscale component image. In some embodiments, the at least one binary image of the grayscale component image can include a second binary image of a grayscale isotropic gradient image, the grayscale isotropic gradient image obtained using the grayscale component image and a static threshold based on isotropic gradient image background noise statistics. The at least one binary image of the grayscale component image can include a composite binary image obtained from a combination of the first and second binary images. The processor can be further adapted to detect location of the column of the liquid sample and location of the optical beam path from the composite binary image. In some embodiments, the processor can be further adapted to detect any bubble in the column of the liquid sample using both the grayscale component image and the at least one binary image of the light scatter component image. Using the grayscale component image can include applying a ring detection filter to a grayscale isotropic gradient image obtained from the grayscale component image. Using the at least one binary light scatter component image can include applying a morphological filter to the at least one binary image of the light scatter component image. In certain embodiments, the processor can be further adapted to distinguish a bubble in the optical beam path from a bubble out of the optical beam path using the grayscale component image, the at least one binary image of the light scatter component image, and the calculated location of the optical beam path.

In yet another embodiment, a method of analyzing an image includes collecting images of a liquid sample disposed between a capital and a pedestal, the images being collected while a light source shines light through an optical beam path between the capital and the pedestal, detecting location of a column of the liquid sample and location of the optical beam path from the images, detecting any bubble in the column of the liquid sample using the images, and reporting an image analysis summary to a display. Collecting images of the liquid sample can include collecting YUV color images, obtaining from the YUV color images a grayscale component image and a light scatter component image, and obtaining at least one binary image of the grayscale component image and at least one binary image of the light scatter component image. The at least one binary image of the grayscale component image can include a first binary image of the grayscale component image obtained from applying an upper dynamic threshold and a lower dynamic threshold obtained from an interpolation between left and right background variation thresholds in the grayscale component image. In some embodiments, the at least one binary image of the grayscale component image can include a second binary image of a grayscale isotropic gradient image, the grayscale isotropic gradient image obtained using the grayscale component image and a static threshold based on isotropic gradient image background noise statistics. In certain embodiments, the at least one binary image of the grayscale component image can include a composite binary image obtained from a combination of the first and second binary images. In some embodiments, the method can further include detecting location of a column of the liquid sample and location of the optical beam path from the composite binary image. In certain embodiments, detecting any bubble in the column of the liquid sample can include using both the grayscale component image and the at least one binary image of the light scatter component image. Using the grayscale component image can include applying a ring detection filter to a grayscale isotropic gradient image obtained from the grayscale component image. Using the at least one binary light scatter component image can include applying a morphological filter to the at least one binary image of the light scatter component image. In certain embodiments, the method can further include distinguishing a bubble in the optical beam path from a bubble out of the optical beam path using the grayscale component image, the at least one binary image of the light scatter component image, and the calculated location of the optical beam path.

This invention has many advantages, such as enabling detection of conditions where the amount of light transmitted through the system is affected by physical factors, including broken or misshapen sample columns, misplacement of the sample on the interface, and bubbles in the sample.

BRIEF DESCRIPTION OF THE DRAWINGS

FIG. 7A is the ROI part of the camera source color image. FIG. 7B is the grayscale (intensity) component that is extracted from FIG. 7A. FIG. 7C is its extracted complementary light scatter component (used for the scattered light measurement).

FIG. 29A illustrates a 3D geometric shape of the filter while FIG. 29B is its digital approximation as a 9×9 matrix (for illustrative purposes the matrix values are multiplied by 100). The 3D shape of the filter represents a raised circular plateau around its perimeter and a negative circular cavity area in the center. The rest of the kernel is set to the intensity value of 0. The filter is designed to correlate with ring-like particles on the intensity gradient image (see FIG. 27) that enables measuring the ring-shaped feature intensity.

FIGS. 30A-1 through 30B-2 illustrate the application of the ring filter to a single image row: the gradient image (FIG. 30A-1) with its row profile (FIG. 30A-2) is shown in the top left. The ring filter (top right) is applied to all row pixels by using the formula shown below, where $K_j$ is a kernel coefficient in kernel position j, $P_i$ is a pixel intensity in row position i and $F_i$ is a result value in position i. The ring filter is applied to all image rows. FIG. 30B-1 shows the resulting image with its cross-section row. Note the result peak, shown in FIG. 30B-2, that corresponds to the ring-shape feature on the gradient image (marked with an arrow on top).

FIGS. 32A-32B illustrate the case of a broken column. FIG. 32A is an initial extracted ROI image. FIG. 32B is a (binary) image that shows the result of the analysis algorithm application that correctly detects two broken pieces (highlighted by stippling).

Like reference numerals refer to corresponding parts throughout the several views of the drawings.

DETAILED DESCRIPTION OF EMBODIMENTS

Figure 1A:
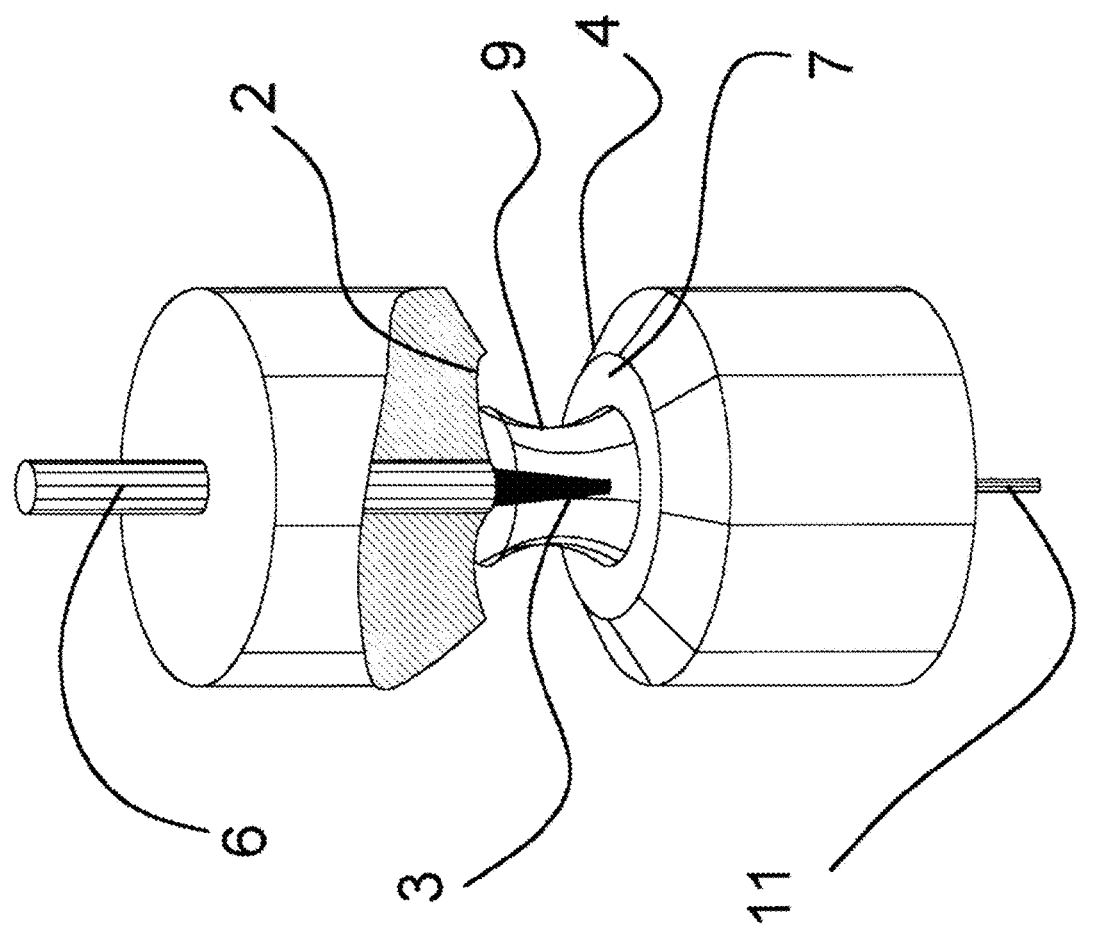
FIG. 1A is an illustration of a cutaway section of the optical path in a prior art spectrophotometer.

In the description of the invention herein, it is understood that a word appearing in the singular encompasses its plural counterpart, and a word appearing in the plural encompasses its singular counterpart, unless implicitly or explicitly understood or stated otherwise. Furthermore, it is understood that for any given component or embodiment described herein, any of the possible candidates or alternatives listed for that component may generally be used individually or in combination with one another, unless implicitly or explicitly understood or stated otherwise. Moreover, it is to be appreciated that the figures, as shown herein, are not necessarily drawn to scale, wherein some of the elements may be drawn merely for clarity of the invention. Also, reference numerals may be repeated among the various figures to show corresponding or analogous elements. Additionally, it will be understood that any list of such candidates or alternatives is merely illustrative, not limiting, unless implicitly or explicitly understood or stated otherwise. In addition, unless otherwise indicated, numbers expressing quantities of ingredients, constituents, reaction conditions and so forth used in the specification and claims are to be understood as being modified by the term "about."

Accordingly, unless indicated to the contrary, the numerical parameters set forth in the specification and attached claims are approximations that may vary depending upon the desired properties sought to be obtained by the subject matter presented herein. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the subject matter presented herein are approximations, the numerical values set forth in the specific examples are reported as precisely as possible. Any numerical values, however, inherently contain certain errors necessarily resulting from the standard deviation found in their respective testing measurements.

As the popularity of UV/Vis spectrometers such as the NanoDrop™ (Thermo Electron Scientific Instruments, Madison Wis.) grows, there is a demand to improve the reliability of its measurement technique that relies, as discussed above, on the surface tension of a liquid sample (drop). A problem is that the spectral measurement of the liquid drop (column) can be degraded by unevenness of the liquid column shape and its position during the measurement. The liquid column can be misshaped (skewed), off-center (relative to the light path of the instrument), can contain bubbles or other inclusions, or the liquid column can even be broken apart. Presently available instruments have no ability to automatically identify and report these problems, while the visual inspection of the liquid drop shape is very limited and unreliable. The design described herein includes a high-resolution video camera in front of the sample compartment that focuses on the liquid column and uses computer vision algorithms for automatic identification of the liquid column defects and reporting them to the instrument operator. The image analysis system also includes measurement and reporting of scattered light that is caused by bubbled liquid, which degrades the measurement. The video camera and spectrometer are synchronized together and every spectral measurement is accompanied with a column image quality metric.

Figure 1B:
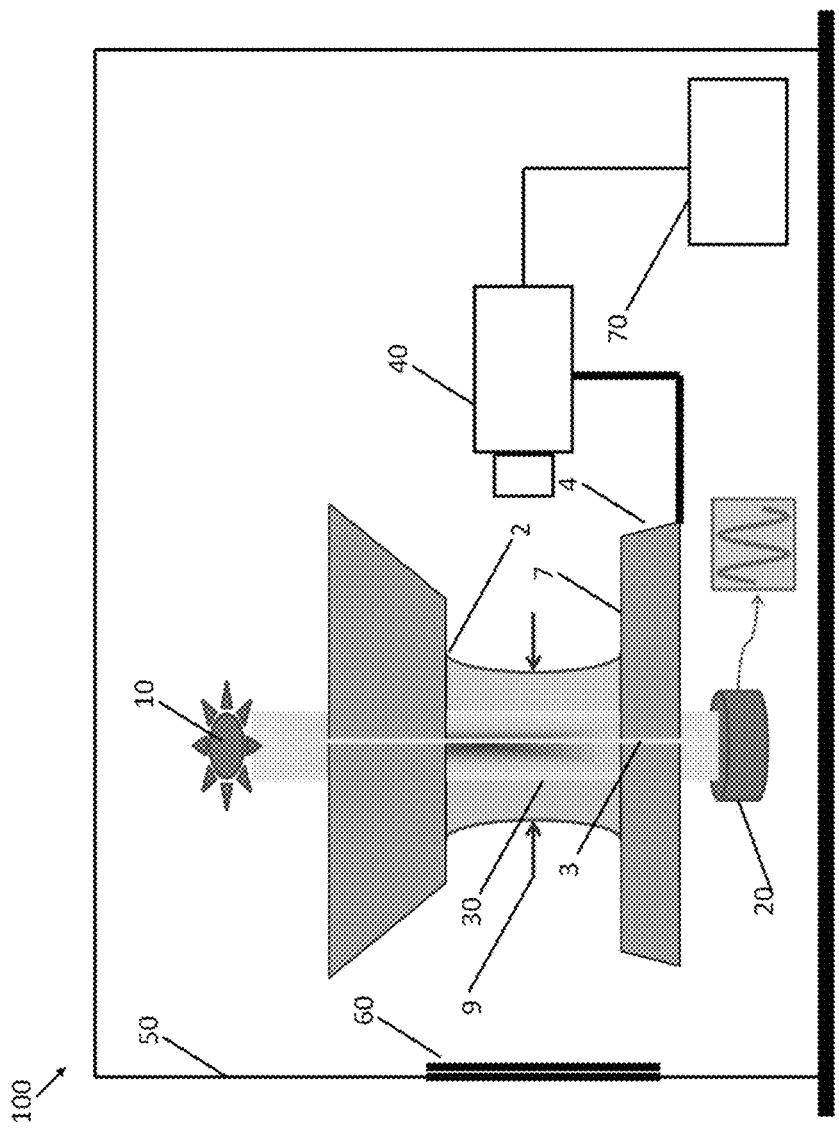
FIG. 1B is a schematic illustration of a spectrophotometer where a sample in a form of a liquid drop (column) is contained in a compartment between two planar interface surfaces. The source of a UV light is located on the top part (capital) and a spectrophotometric detector is beneath the bottom part (pedestal) of the device. An optical path can be established between the source and the detector. A video camera collects color images of the liquid drop against a background.

FIG. 1B shows a spectrophotometer 100 where a sample in a form of a liquid drop (column 9) is contained between two planar interface surfaces 2 and 7 (compartment). The source 10 of light is located on the top part (capital 2) and a spectrophotometric detector 20 is beneath the bottom part (pedestal 4) of the device and an optical path 30 can be established between them.

The quality of the measurement depends on the quality of the measured liquid column 9 during the time when the light beam 3 is passing through it. The quality of the column 9 is very hard to analyze visually because the gap (distance between two interface surfaces 2 and 7) is too narrow—1 mm or less.

Figures 4A, 4B, 4C:
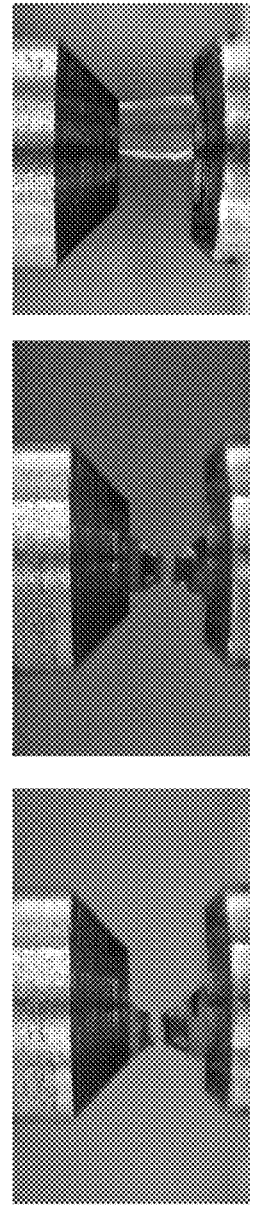
FIGS. 4A-4C show examples of a first type of possible defects of the liquid column—skewed (FIG. 4A) and off-center (FIG. 4C) columns that provide only partial or no optical path between the two interface surfaces.
Figures 5A, 5B, 5C:
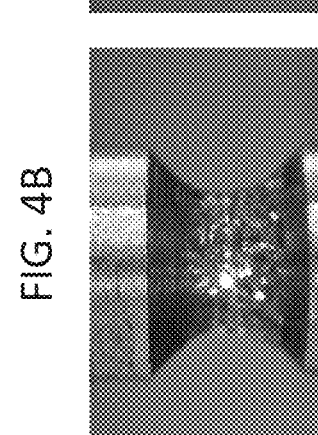
FIGS. 5A-5C show examples of a second type of defects—scattered light that is caused by the reflection from the surface of the bubbles or other inclusions. Bubbles are made of air (or gas) and are considered defects that degrade spectrophotometric measurement.

The possible column defects can be summarized in the following categories:

Skewed and off-centered column. Examples of this defect are presented in FIGS. 4A-4C;

Bubbled column of column with inclusions. See FIGS. 5A-5C for examples.

Figure 6A:
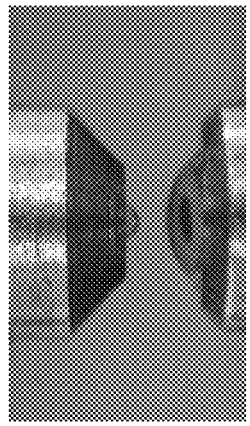
FIGS. 6A-6C show examples of two terminal conditions—a broken column (split apart in two drops) (FIGS. 6A and 6B) or void/empty (FIG. 6C) space between the two interface surfaces. No spectrophotometric measurement can be made in these conditions.
Figure 6B:
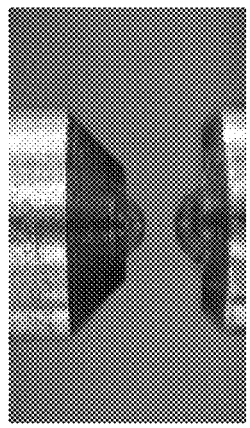
Figure 6C:
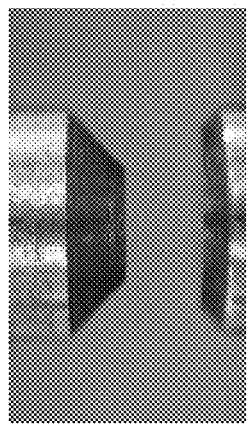

Broken column or empty compartment (no liquid drop). This is a terminal defect—no column quality measurement will be made. See FIGS. 6A-6C for examples.

Figure 2:
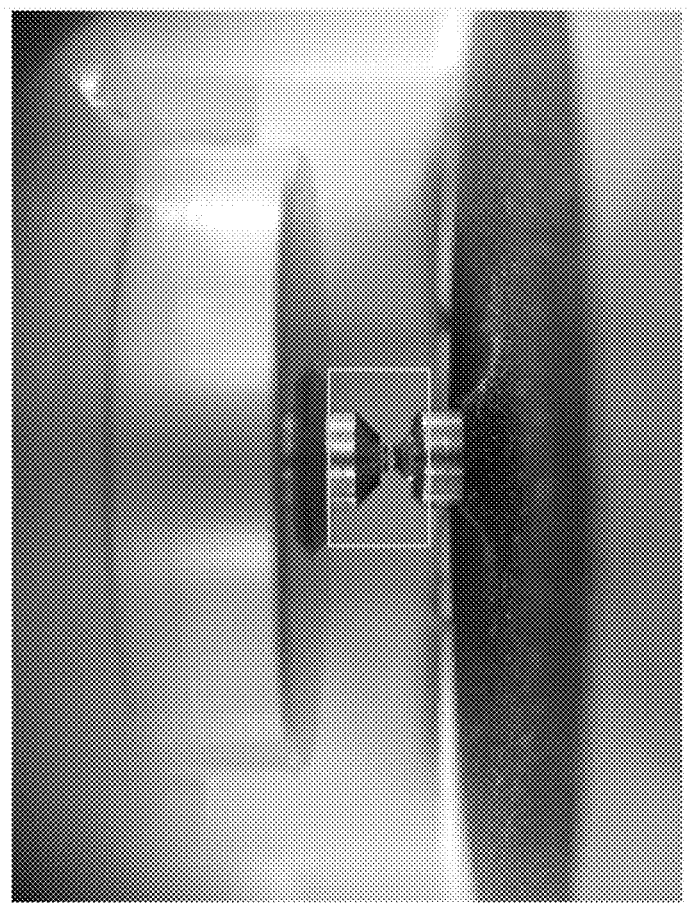
FIG. 2 shows original high-resolution camera image of the measurement compartment. The indicated rectangular area shows the initial region-of-interest (ROI), which is large enough to capture all the necessary features of the image, including a large portion of its gray background.
Figures 3A, 3B, 3C:
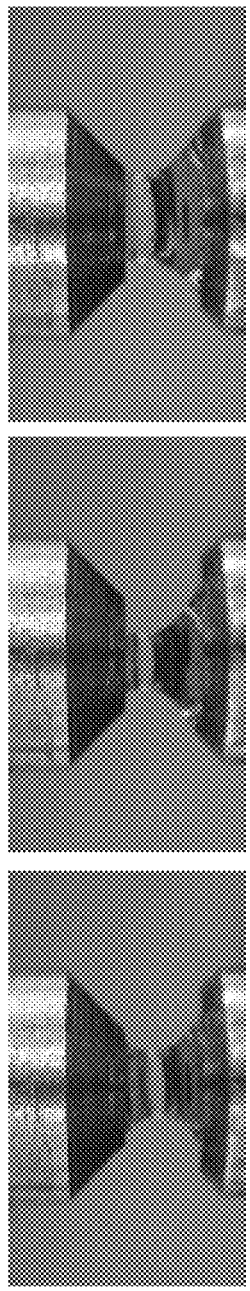
FIGS. 3A-3C show examples of normal liquid columns that provide good optical paths between the two interface surfaces (capital and pedestal).

Turning back to FIG. 1B, a video camera 40 collects YUV color images of a liquid sample 9 disposed between a capital 2 and a pedestal 4, the color images being collected while a light source 10 shines light 3 across an optical beam path 30 between the capital 2 and the pedestal 4 for inspection of the quality of the liquid column 9. The camera 40 is mounted on the instrument pedestal 4 and focused into the gap between the two light transmitting interfaces 2 and 7 where the liquid column 9 is expected to be formed. FIG. 2 shows a typical video camera image. Turning back to FIG. 1B, the camera view is shielded from the direct ambient light by a cover 50 that also creates a background 60. The surface of the background 60 is made of a homogeneous reflective material and has a light (about 82% brightness and 12% gloss) gray color. The background surface 60 is similar to the gray card that is used in photography for creating diffuse (Lambertian) reflectance. The background surface light gray homogeneous reflective background minimizes glossiness and makes the background homogeneous, which produces a narrow, Gaussian-shaped peak on the intensity histogram when the image is acquired by a camera.

The camera video can be inspected by the operator of the instrument; however, a more accurate and convenient way is to use machine vision algorithms. A processor 70 is adapted to i) obtain from the YUV color images a grayscale component image and a light scatter component image, and ii) obtain at least one binary image of the grayscale component image and at least one binary image of the light scatter component image.

Scattered light is emitted while acquiring a spectrum on a column with inclusions, such as bubbles of gas or air. The blue wavelength range is the prevailing component in the scattered light, because of the strong ($\lambda^{-4}$) wavelength dependence of Rayleigh scattered light (shorter wavelengths (blue) are Rayleigh scattered more strongly than longer wavelengths (red)). The resulting spectrum quality can be degraded due to the loss of the beam energy that reflects from the bubbles and gets scattered. By applying machine vision algorithms, it is possible to quantitatively measure the amount of scattered light.

Although it is possible to analyze the original color image on a modern computer, it leads to unnecessary complexity and redundancy. For image analysis, two intensity-only (grayscale) images are created in one of three possible ways:

1. When one has just one color RGB image (snapshot), the image is extracted and the following two component images are created:

a. A grayscale component (luma) image (L) is created by averaging the Red (R) and Green (G) components from the original RGB image. For every x,y-positioned image pixel, the following calculation is applied:

$$L(x,y)=(R(x,y)+G(x,y))/2;$$

b. The blue chromatic component (for the light scatter component) image (S) is created by using the original blue (B) component from the RGB image and calculating the following complementary image, for every x,y-positioned pixel as follows:

$$S(x,y)=\max(0,B(x,y)-L(x,y));$$

Figure 8A:
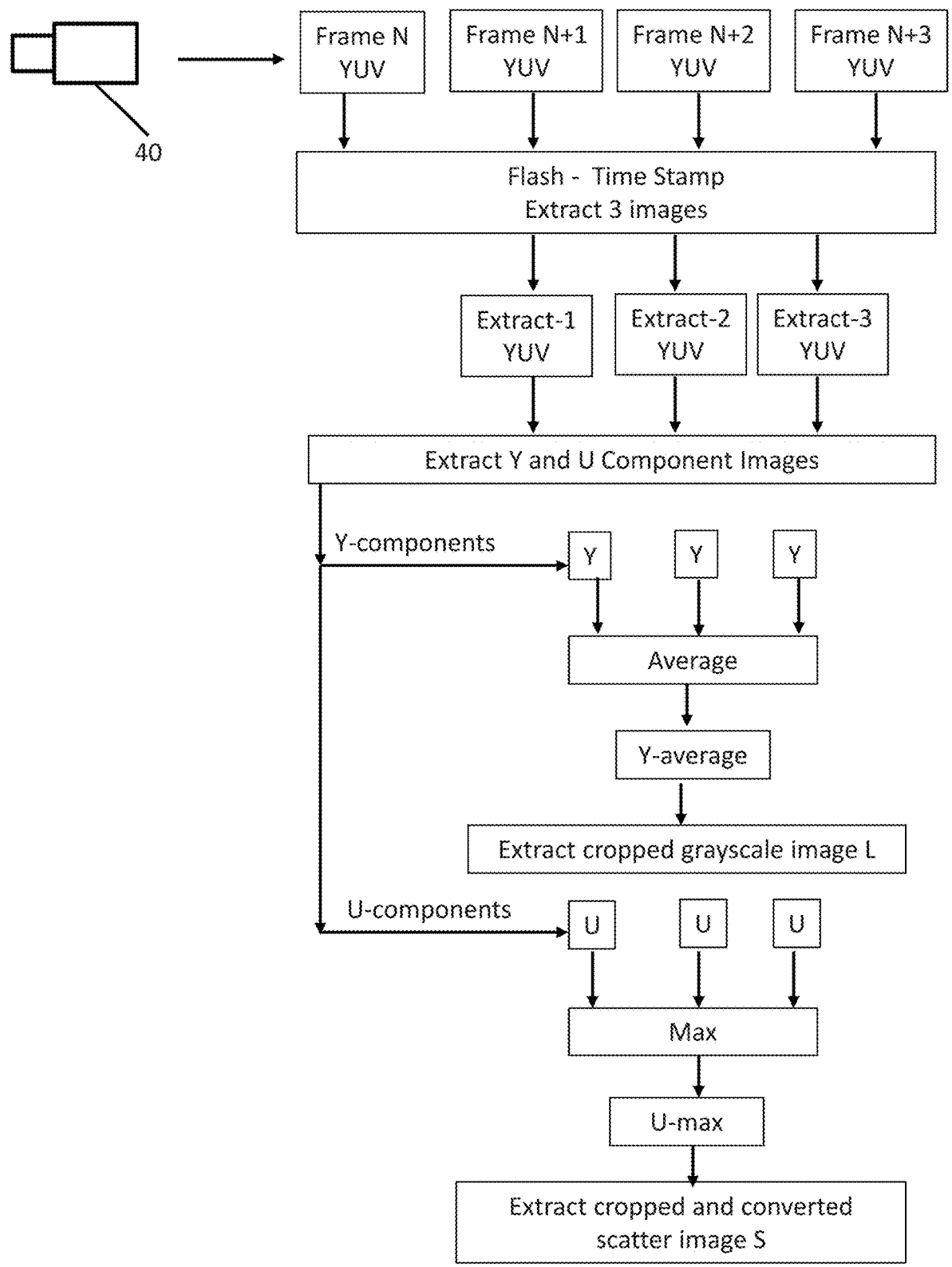
FIG. 8A is a flowchart of image collection from the camera video stream and grayscale and light scatter component image extraction from the YUV color images.

2. In the case of the YUV image format (that is available on the Android/Linux system) the calculation of the two component images is:

a. The grayscale component image is the Y (luma) component of the original YUV image, that is: $L(x,y)=Y(x,y)$;

b. The light scatter component image S is created by using the U-chrominance component from the YUV image and calculating the following complementary image, for every x,y-positioned pixel: $S(x,y)=\max(0, U(x,y)-128)$;

3. In case a sequence of YUV images of varying flash light is available from the camera video stream obtained according to the flowchart shown in FIG. 8A (step 800 in FIG. 8B), 3 images for instance, the calculation of the two component images is done as follows:

a. A grayscale component image is calculated as an average of all available $Y_i$ (luma) components of the original YUV images from the sequence (step 801 in FIG. 8B), that is:

$$L(x,y)=(Y_1(x,y)+Y_2(x,y)+Y_3(x,y))/3;$$

b. Let $S_i(x,y)$ be the light scatter (blue chromatic) intensity for the i-image in pixel (x,y) that is calculated from the $U_i$-component using the formula above (see 2.b). Then the S(x,y) light scatter component image is calculated by taking the maximum of all available $S_i(x,y)$ for each pixel (x,y) as follows:

$$S(x,y)=\max(S_1(x,y),S_2(x,y),S_3(x,y));$$

The maximum of $S_i(x,y)$ is used to obtain the maximum scattered light that corresponds to the flash occurrence moment.

Figure 7A:
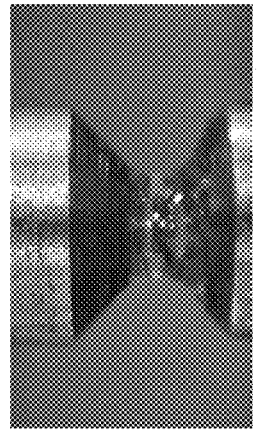
FIGS. 7A-7C illustrate the component image extraction that is used for the image analysis.
Figure 7B:
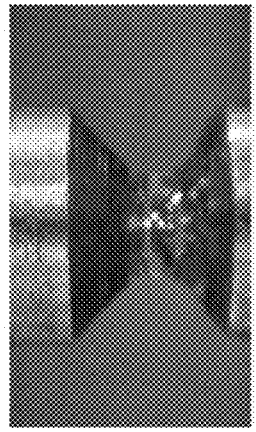
Figure 7C:
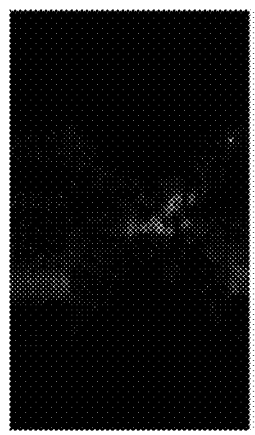

See FIGS. 7B and 7C for illustrations of the two-component split images. FIG. 7A is the fragment of the source camera color image. FIG. 7B is the grayscale component image that is extracted from the source RGB image and FIG. 7C is its light scatter component.

The following steps form the liquid column analysis algorithm:

1. Let a grayscale image L of size M×N consist of pixels $g_{i,j}$, such that $i \in [0, M-1]$, $j \in [0, N-1]$) $0 \leq g_{i,j} \leq 255$.

In other words $g_{i,j}$ is the image rectangular area and its value (intensity) can vary from 0 to 255.

Figure 9:
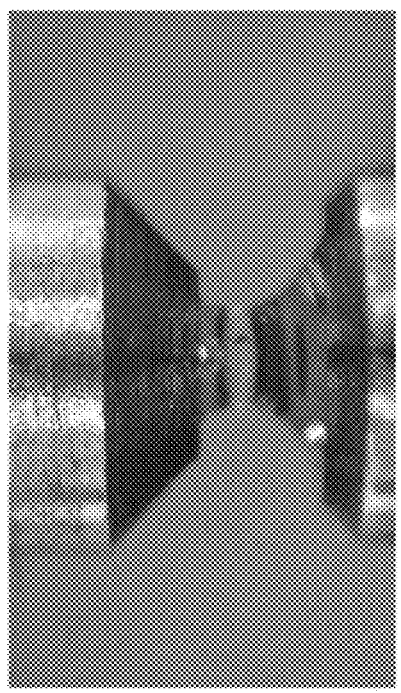
FIG. 9 shows the extracted initial ROI image that contains the grayscale (luma) component of the original camera image.
Figure 10:
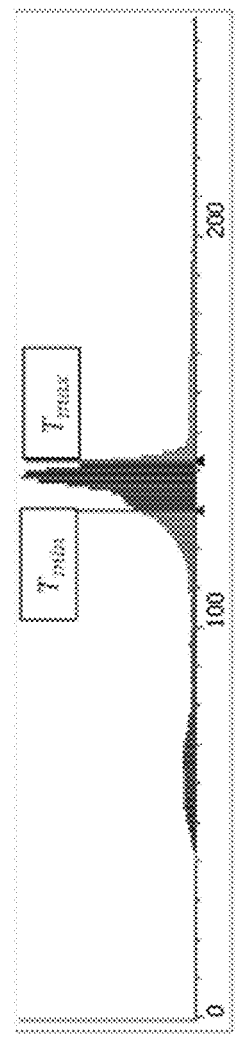
FIG. 10 shows the histogram of the initial grayscale ROI image (from FIG. 9). The largest peak represents background intensity. The delineated area between $T_{min}$ and $T_{max}$ shows the selected background intensity range.

2. Use the extracted grayscale image L (FIG. 9) to calculate a histogram shown in FIG. 10 of all pixels of the source image. Find the image background intensity range ($T_{min}$, $T_{max}$) using the largest intensity peak of the image histogram (FIG. 10). The background is assumed to be homogeneous with a Gaussian intensity distribution and the background area is assumed to take at least 50% of the extracted grey image. Check the histogram parameters: peak position and its width to verify the background quality. If the peak position is less than 40 (too dark) or greater than 210 (too bright) or the peak width is wider than 80, then report that the background is poor and skip the rest of image analysis. (steps 803 and 804 in FIG. 8B).

3. Create a horizontal cumulative profile by summation of the absolute pixel-minus-background values along each image column. That is, by calculating $\Sigma_i \delta_{i,j}$ where $$\delta_{i,j} = \begin{cases} g_{i,j} - T_{max}, & \text{if } g_{i,j} > T_{max} \\ T_{min} - g_{i,j}, & \text{if } g_{i,j} < T_{min} \\ 0, & \text{otherwise} \end{cases};$$

4. See FIG. 12 for an example of a cumulative profile that is calculated for the image shown in FIG. 11.

5. Find the left and right edges of the instrument capital (upper part, see FIG. 11) by finding edges of the plateau intensity in the profile (see FIG. 12). They correspond to the capital position and its diameter on the grayscale image and are used for the region-of-interest (ROI) extraction.

Figure 13:
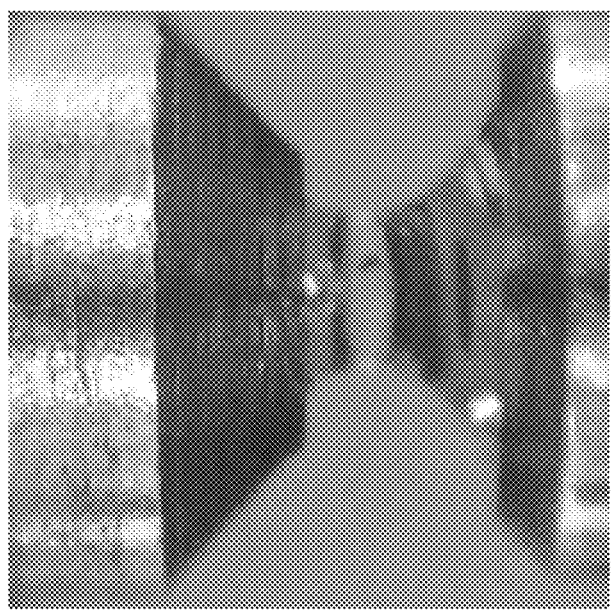
FIG. 13 shows the extracted horizontal part of the grayscale image that is used for processing and further extracting the ROI of the compartment features such as the capital and the pedestal.

6. Extract a new ROI image that embraces the found features (the capital and the pedestal) with additional extension on both sides as shown in FIG. 13.

Figure 14:
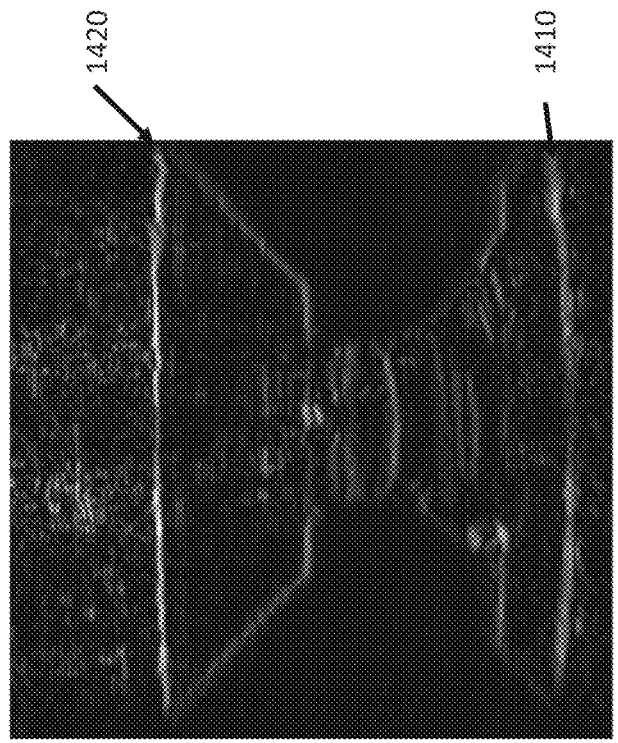
FIG. 14 represents the result of applying horizontal gradient filter to the grayscale image (from FIG. 13). It highlights two main edges—one is for the capital (top horizontal edge 1420) and second for the pedestal (bottom horizontal edge 1410).

7. Apply a horizontal gradient (Sobel operator, see page 578 of Digital Image Processing, Rafael C. Gonzalez and Richard E. Woods, $2^{nd}$ Ed., Prentice Hall, 2002, (hereinafter "Gonzalez") the entire contents and teachings of which are hereby incorporated by reference in their entirety) filter to the extracted ROI grayscale image to find the lower horizontal capital edge 1420 and the upper horizontal pedestal edge 1410 thereby detecting a region-of-interest that includes a location of the capital and the pedestal from the grayscale component image as shown in FIG. 14.

8. Create a vertical cumulative profile shown in FIG. 15 of the gradient image shown in FIG. 14 by summation of pixel values along each image row, that is $\Sigma_i g'_{i,j}$, where $g'_{i,j}$ is a pixel intensity of the gradient image at the i,j position.

Figure 15:
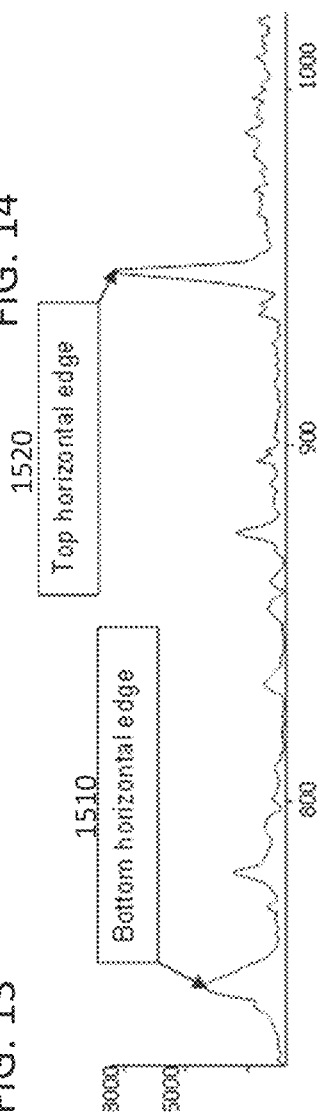
FIG. 15 shows how the vertical part of the ROI gets extracted using the profile of the cumulative profile from the grayscale image (FIG. 11). The profile is made by summation of the pixel values for each horizontal column of the image. The vertical portion of the target ROI resides between the two tallest peaks, which represent the horizontal edges of the capital and the pedestal.

9. Find two main intensity peaks 1510 and 1520 on the vertical cumulative profile (FIG. 15). Its right (tallest) peak 1520 corresponds the lower edge of the capital (top boundary or top horizontal edge) while the left (second intensity) peak 1510 corresponds to the upper edge of the pedestal (bottom boundary or bottom horizontal edge).

Figure 16:
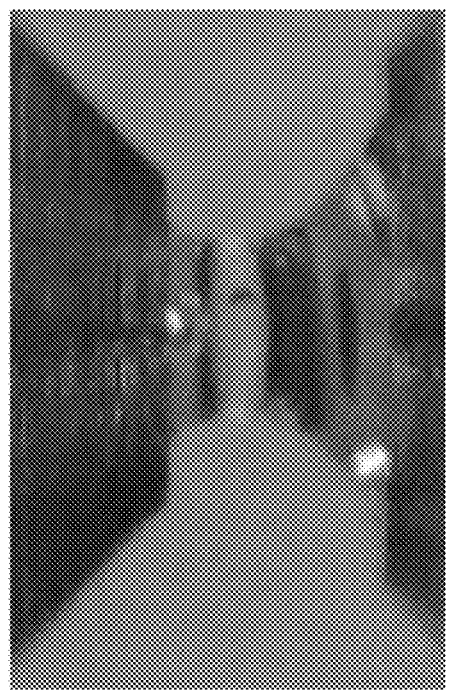
FIG. 16 shows the extracted grayscale ROI image that is used for further extraction of the instrument interface area.

10. Using the found boundaries from the previous step, extract the vertical part of the ROI sub-image for further processing (FIG. 16).

Figure 17:
FIG. 17 shows the resulting image after applying the diagonal (45 degree) gradient filter and shows the extracted right diagonal edge of the upper conical capital surface that is fitted by a line segment (shown in white).

11. Find the right edge of the capital on the top of the ROI image (FIG. 16). Apply a 45-degree diagonal gradient filter on the image. Fit the top right set of the gradient intensity pixels with a diagonal line segment by finding the best least-square fit to the right diagonal edge 1710 (FIG. 17).

Figure 18:
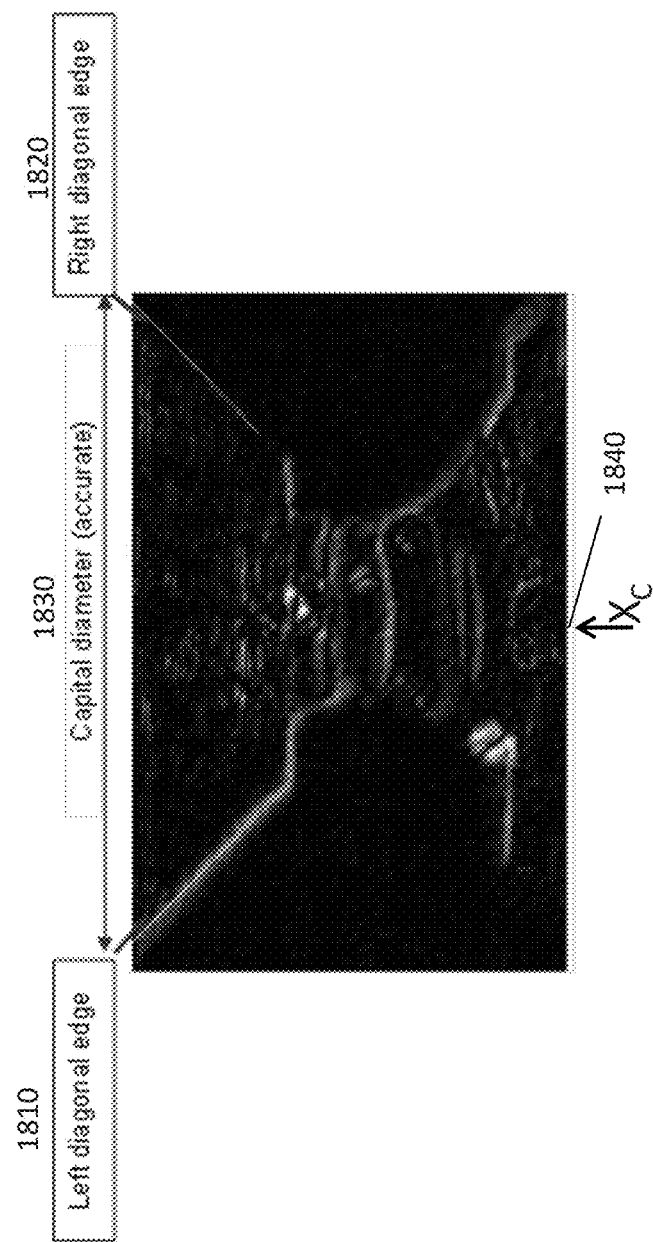
FIG. 18 shows the resulting image after applying the diagonal (135 degree) gradient filter and shows the extracted right diagonal edge of the left conical capital surface that is fitted by a line segment (shown in white). The distance (in pixels) between the two ends of the extracted edge segments serves as a measure of the capital diameter 1110 shown in FIG. 11. The measured capital diameter 1110 is then used for accurate extraction of the sample compartment area.

12. Continue on to finding the left edge of the capital. Apply a 135-degree diagonal gradient filter. Fit the top left set of the gradient intensity pixels with a 135-degree diagonal line segment by finding the best least-square fit. FIG. 18 shows both the fitted capital left diagonal edge 1810 and the right diagonal edge 1820. Using the left and right ends of the found segments, calculate the capital diameter in pixels 1830 and $X_C$ the position of the optical path center 1840. The calculated capital diameter 1830 enables accurate matching of the real instrument coordinate units with the image (pixel) units. The optical path center $X_C$ is used for the column feature position evaluation.

Figure 19:
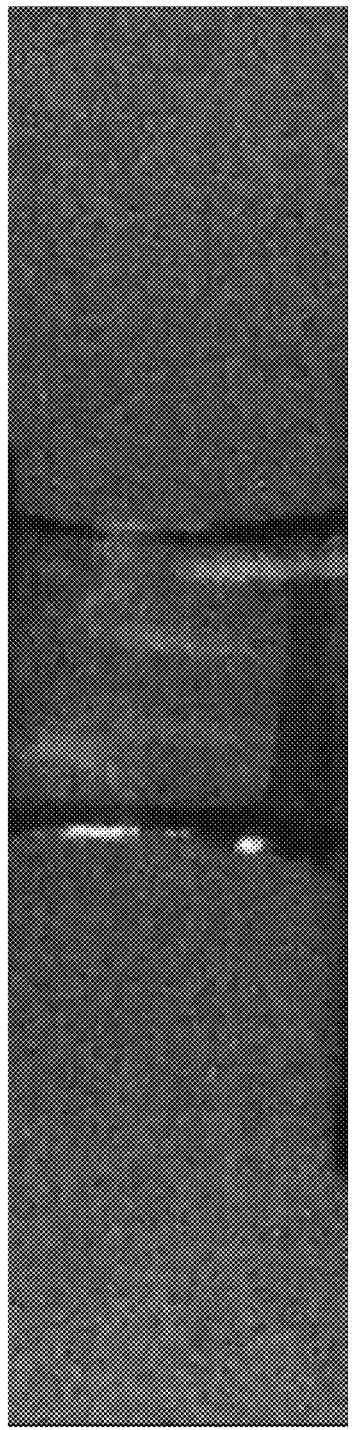
FIG. 19 shows the final extracted ROI grayscale image that is centered (relatively to the axis of the light path) and contains only the area where the liquid column (droplet) is expected with a sufficient amount of the background area on both sides of the image.

13. Use previously found capital diagonal edges and knowledge of the actual sizes of the capital and pedestal to extract the final ROI image that is centered with respect to both the instrument capital and pedestal (step 805 in FIG. 8B). Add extra room on the left and the right of the extracted ROI image in order to include more background area as shown in FIG. 19.

14. Calculate background parameters for the left and the right parts of the image using the left background rectangular areas 2010 and 2020 and right background rectangular areas 2030 and 2040 where the background is expected (see white rectangles in FIG. 20). The selected background rectangular areas enable estimating the background intensity ranges for the different parts of the grayscale image, while accounting for illumination differences between left and right parts of the image.

15. A thresholding technique is then applied to create convenient binary images (an example is shown as a stippled image overlay in FIG. 20), which are used for the column positioning and measurement. A binary image is a digital image that has only two possible values for each pixel. Usually those two values are called foreground (value=1) and background (value=0). See Gonzalez, page 595, for a description of thresholding techniques.

Figure 21:
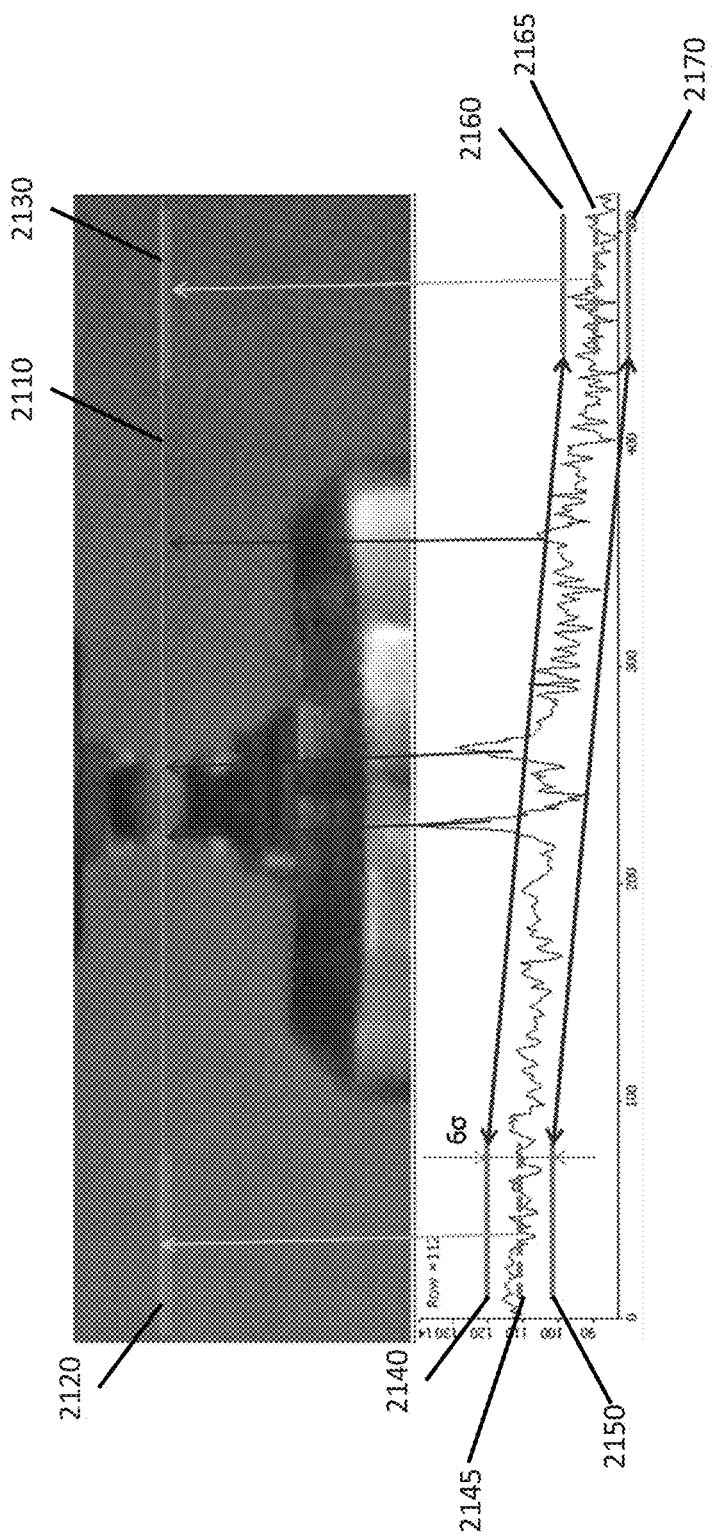
FIG. 21 illustrates the dynamic thresholding technique for just one row of grayscale image. The threshold band is created by using mean values and the cumulative standard deviation (σ) of pixel intensity values from two background regions (left and right, marked in gray) and applying a linear interpolation between upper and lower band thresholds. The band width is 6σ. Pixels with intensity above (and below) the band are assigned to a binary foreground. Note the difference in image brightness between the left and right parts of the image.

16. Create a first binary image of the grayscale ROI image by applying dynamic thresholding that uses an interpolation between the left and right background thresholds to calculate a threshold for each pixel individually. FIG. 21 illustrates the dynamic thresholding technique for just one row 2110 of grayscale image. The threshold band is created by using mean values and the overall standard deviation ($\sigma$) of pixel intensity values from two background regions 2120 and 2130 (left and right rectangles, respectively, that are marked in gray) and applying an interpolation between the upper and lower band thresholds. The band width is 6 $\sigma$. Pixels with intensity above (and below) the band are assigned to a binary foreground. Note the difference in image brightness between left and right parts of the image of FIG. 21. The left lower threshold value $T_{min}$. 2150 is calculated by using the left background area mean value $M_L$ 2145 and its standard deviation $\sigma$ as $T_{min}=M_L-3\sigma$. The left upper threshold $T_{max}$ 2140 is calculated using the same values as $T_{max}=M_L+3\sigma$. The lower right 2170 and upper right 2160 thresholds are calculated using equivalent formulas and the right background area mean value $M_R$ 2165 and its standard deviation $\sigma$. In the example shown in FIG. 21, the values are approximately $M_L$=110, $M_R$=90, and $\sigma$=3.3 for both $M_L$ and $M_R$. The lower and upper band thresholds for all pixels on row 2110 between the two bands 2120 and 2130 are obtained by interpolation. The interpolation between the upper band thresholds 2140 and 2160, and between the lower band thresholds 2150 and 2170, respectively, can be a linear interpolation, as shown in FIG. 21, or another function, such as a quadratic interpolation, if such a function yields a higher resolution binary image.

Figure 20:
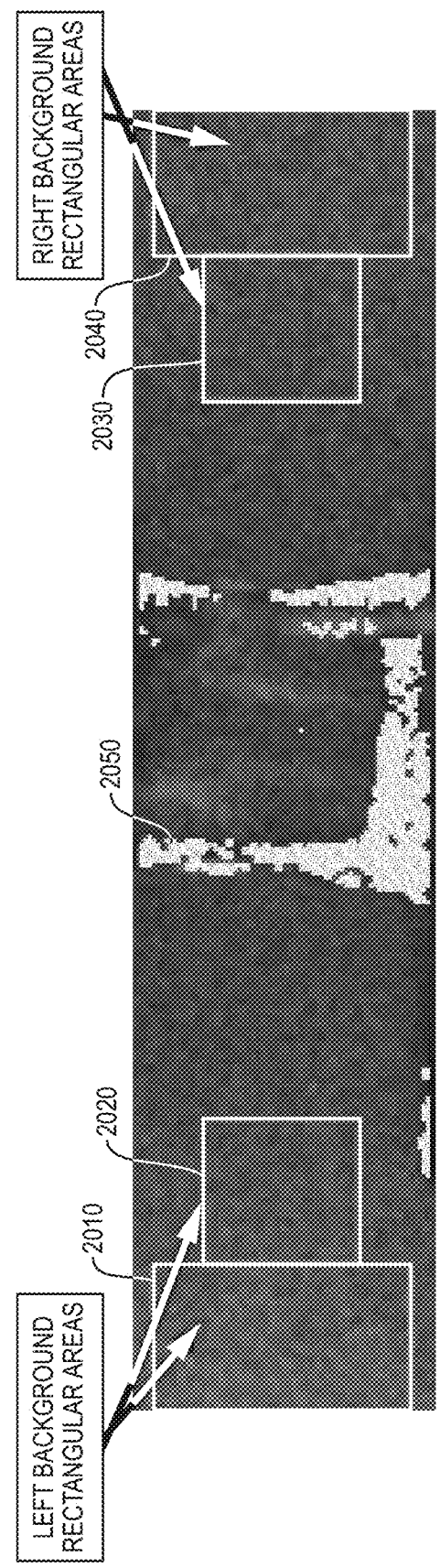
FIG. 20 illustrates the binarization (by a thresholding) of a column grayscale image. It shows the rectangular areas (white rectangles) on both horizontal sides of the image where the background parameters are being calculated. Those parameters are used for setting the binarization thresholds. Note that the result highlighted stippled area (that represents the binary image foreground) has a lot of disconnected segments. It is hard to connect those segments into a column shape.

17. The highlighted stippled area 2050 shown in FIG. 20 is the foreground of a first binary image of the grayscale component image shown in FIG. 21, obtained after applying the dynamic thresholding technique described above to all rows of the grayscale component image shown in FIG. 21. The binary image foreground 2050 has a lot of disconnected segments, which sometimes scatter away from the area of the real column. In this case, it is hard to connect those segments to get the column shape. The connections can be made by using a second binary image.

Figure 22:
FIG. 22 shows a gradient image that is obtained by applying an isotropic gradient filter. The standard deviation of the gradient intensities is calculated using the background areas, which is used for calculating a threshold for the image binarization. Every pixel whose intensity is above the calculated threshold is assigned to a binary foreground (which is shown as a stippled overlay on top of the gradient image).

18. Create a second binary image by using an isotropic gradient of the same grayscale component image and apply static thresholding based on the gradient background statistic. The isotropic gradient image is assumed to have a zero mean value, so the standard deviation is calculated using only the selected left and right sets of rectangles. A statistical ±three sigma ($\sigma$) rule is used to create the threshold for binarization. The resulting second binary image is shown in FIG. 22 where it is overlaid on top of the isotropic gradient (dark) image.

Figure 23:
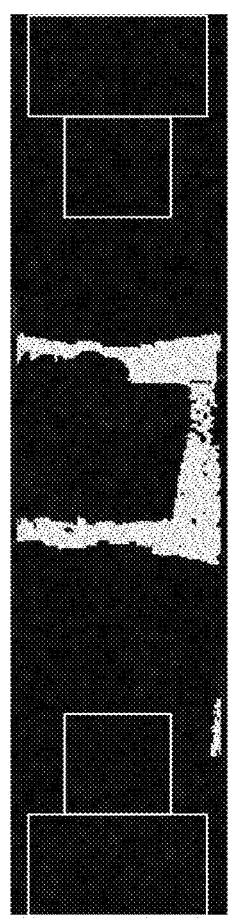
FIG. 23 shows the result of combining two binary foreground images, the one from the grayscale image and another one from the gradient image (FIG. 22) to produce a composite binary image. The resulting binary image is improved—it is much easier now to restore the column shape.

19. Combine the two binary images: the first from the grayscale component image and the second from the isotropic gradient image (above) to produce a composite binary image. The combination enables creating a more complete foreground binary image from disconnected foreground segments. FIG. 23 shows the combined binary image overlaid on the gradient image.

Figure 24:
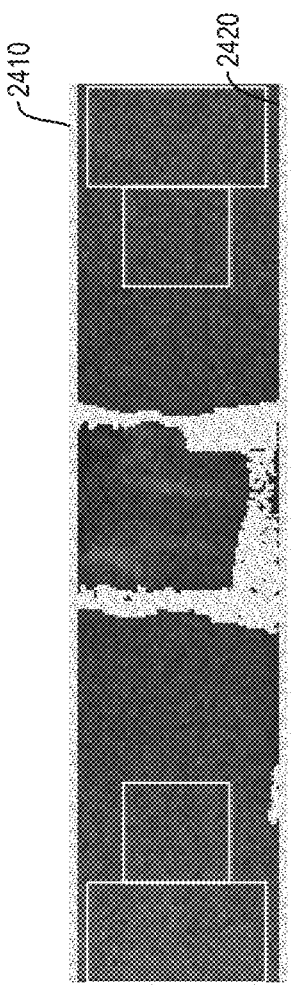
FIG. 24 shows the composite binary image overlaid on top of the grayscale image with the additional application of two horizontal foreground stripes on the top and bottom borders of the binary image. It enables further connecting the left and right edges of the column.

20. For further column shape detection and filling of the foreground cavities, two artificial foreground stripes 2410 and 2420 are added, one on the top 2410 and another one on the bottom 2420 (by setting binary pixels to value of 1). FIG. 24 shows the resulting binary overlaid on top of the original grayscale image.

Figure 25:
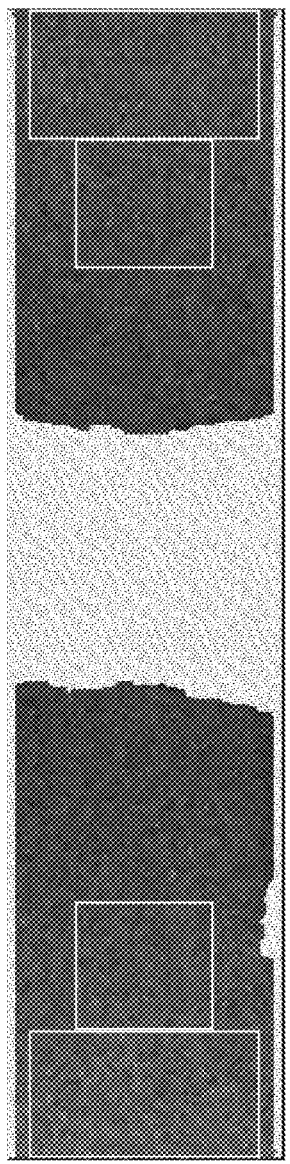
FIG. 25 shows the result of applying the hole filling operator to the binary image and removing the artificial stripes that are close to the borders. Subsequent morphological filtration removes residuals and smooths the foreground edges.

21. Morphological operations and a hole filling operation are used to fill foreground holes and smooth rough edges. See Gonzalez, pages 528-536. In FIG. 25, the resulting binary image is shown overlaid on top of the grayscale image.

22. The two artificial stripes are removed by setting binary pixels on the top and bottom horizontal edges to background value (0, transparent). Then, a sieving filter is applied for removing small features that account for noise (step 806 in FIG. 8B). The resulting binary image yields a good match between the foreground overlay and the column shape (see FIG. 26), thereby detecting the location of a column of the liquid sample and location of the optical beam path from the composite binary image.

Figure 32A:
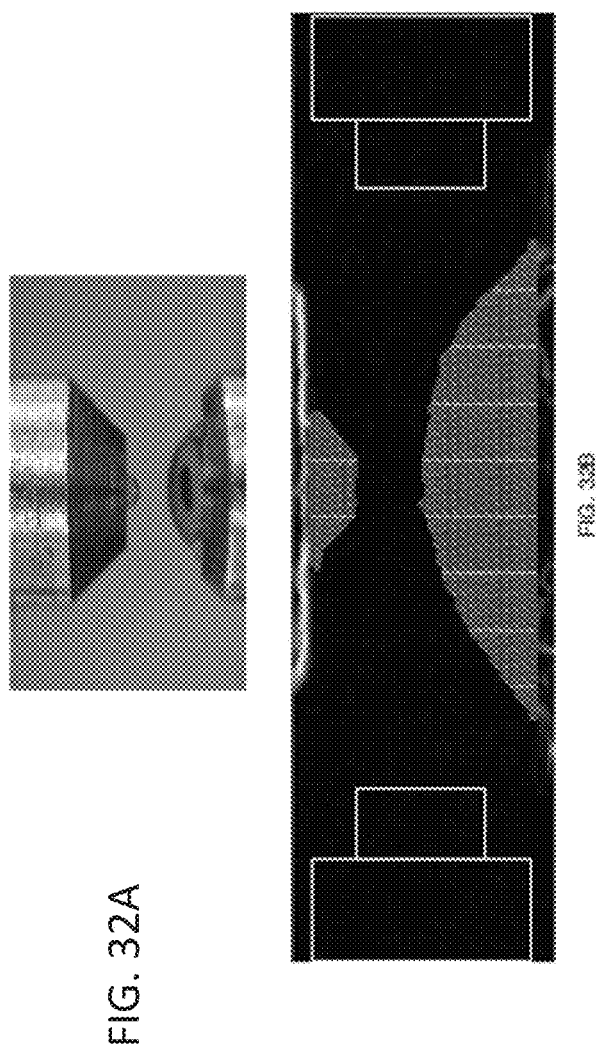

23. Connected foreground object(s) are extracted by using a connected component extraction algorithm (see Gonzalez, page 536), thereby evaluating the integrity of the column of the liquid sample from the composite binary image. Normally, just one object matches the normal liquid column. If there are two or more objects, then it is a broken column case (see FIG. 32 for an example). If no objects are found, then it is an empty compartment case. In the latter two cases no further analysis can be done and an error code is reported to notify the operator (steps 807 and 808 in FIG. 8B).

Figure 26:
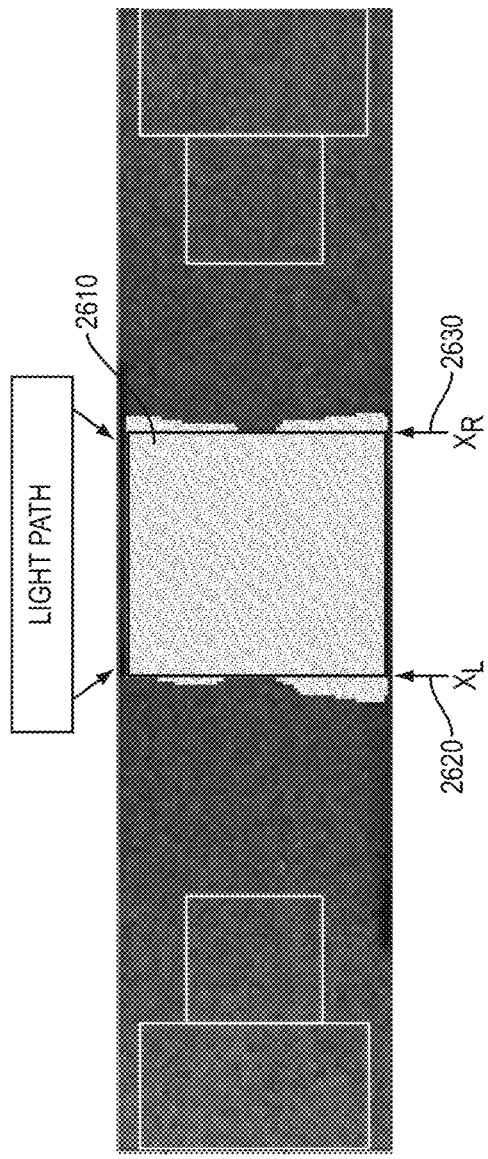
FIG. 26 shows the result of fitting a rectangle into the column shape that represents the theoretical optical path (a cross-section of a cylinder in 3D space).

24. Calculate the area of the column shape (in pixels) from the detected binary object 2610, as shown in FIG. 26. Additionally, calculate optical path left edge position $X_L$ 2620 and right edge position $X_R$ 2630 by finding the maximum area rectangle that is enclosed into the detected column binary object 2610. The difference $X_R$-$X_L$ is the light path diameter (step 809 in FIG. 8B). The calculated optical beam center $X_C$ 1840, a theoretical maximum optical beam radius $R_O$ (in one embodiment, $R_O$ is equal to about 1/20th of the calculated capital diameter 1110), the column $X_L$ 2620 and $X_R$ 2630 (the enclosed rectangle vertical edge positions), are used for calculating the off-center parameter. The skewedness and off-center conditions of the column of the liquid sample are detected from the composite binary image if the distance min($X_C$+$R_O$, $X_R$)−max($X_C$−$R_O$, $X_L$) is less than 1.5$R_O$. The theoretical light beam path of radius $R_O$ and centered at $X_C$ should fit into the calculated column light path (rectangle) with the overlap of at least 1.5 light beam radius width.

Alternative image analysis methods for liquid column shape detection include detecting the object of interest, such as the liquid column, by using edge detection operators for extracting the object contour. These operators are based on computing the difference in pixel intensity between light and dark areas of the grayscale image. There are several basic edge detection (gradient) operators that can be applied: Sobel, Laplacian-of-Gaussian, Roberts, Prewitt, or a composite Canny algorithm. The last consists of several steps, including noise suppression and dynamic thresholding/binarization. See Canny, J., "A Computational Approach To Edge Detection", IEEE Trans. Pattern Analysis and Machine Intelligence, Vol. 8(6):679-698, 1986 (hereinafter "Canny"), the disclosure of which is hereby incorporated by reference in its entirety (however, where anything in the incorporated reference contradicts anything stated in the present application, the present application prevails).

Figure 33:
FIG. 33 is an exemplary image of a liquid column.
Figure 34:
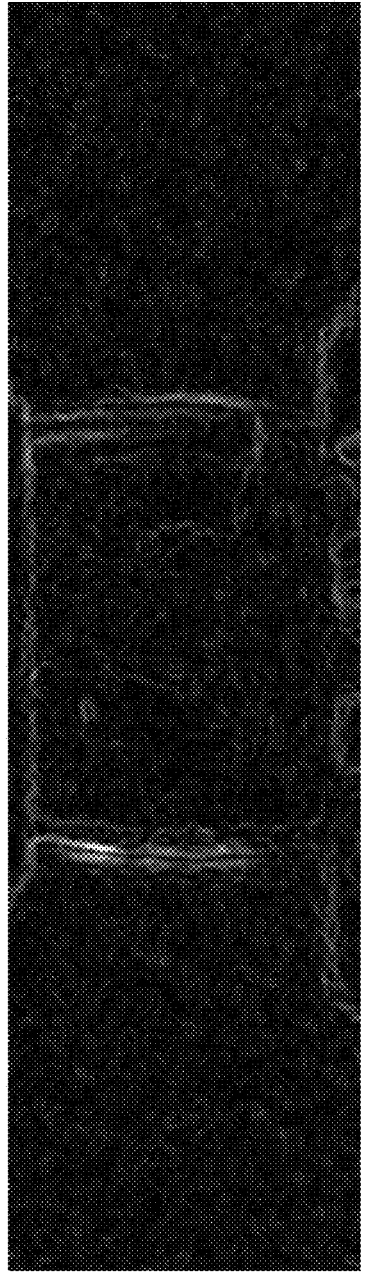
FIG. 34 is a resulting gradient image of the image shown in FIG. 33.
Figure 35:
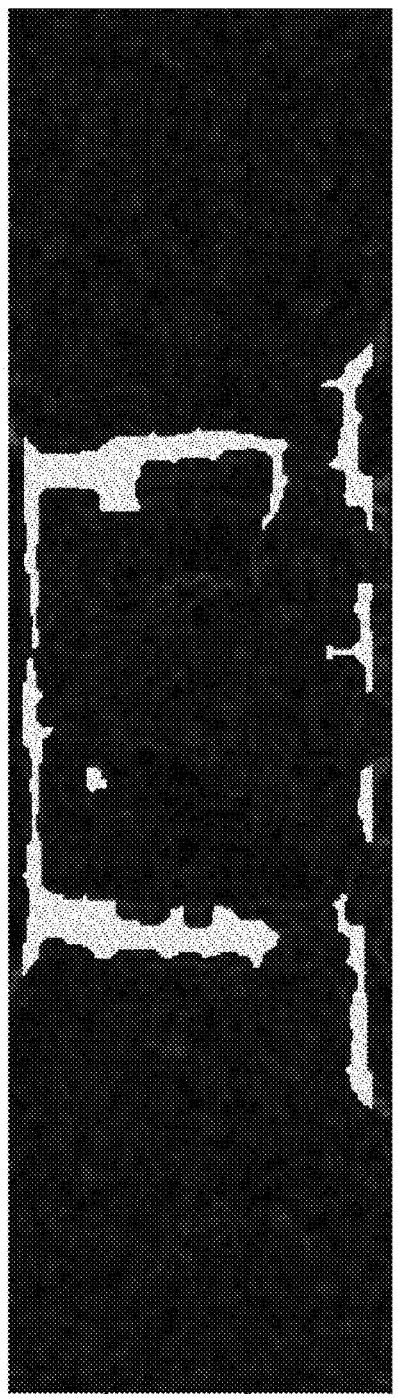
FIG. 35 is a resulting binary image of the image shown in FIG. 33.

However, all of these gradient-threshold methods can fall short when dealing with blurry and noisy images, such as an example of a blurry image of a liquid column shown in FIG. 33. The resulting gradient image obtained after applying the Sobel edge detector operator to the blurry image shown in FIG. 33, shown in FIG. 34, reveals the edges (light stripes) of the column but they are washed out on the bottom part. After thresholding/binarization the resulting binary image (stippled overlay) shown in FIG. 35 contains several discontinuous parts with additional spurs. The reason for the failure to detect a contiguous contour (shape) is that the gradient or edge detector operators operate in local image areas (windows), such as 3×3, 5×5, etc., pixel wide areas and thus these operators miss 'high'-level structural information about the object contour shape.

The active contour tracking (also referred to as "snakes") method can be used to address the disconnected or noisy (spurious) contour outcome. See Kass, M.; Witkin, A.; Terzopoulos, D. "Snakes: Active contour models" International Journal of Computer Vision, Vol. 1 (4): 321, 1988, and Chenyang Xu "Snakes, Shapes, and Gradient Vector Flow" IEEE Transactions on Image Processing, Vol. 7 (3), 1998, the disclosures of which are hereby incorporated by reference in their entirety (however, where anything in the incorporated references contradicts anything stated in the present application, the present application prevails). The active contour tracking method is a combination of the edge detector operators followed by the contour tracking of the result (binarized) that uses the contour curve properties such as its continuity and smoothness. The active contour method is based on the idea of using an energy functional, which represents a weighted combination of internal and external forces that are applied to the contour curve. The internal forces are governed by the physical properties of the contour (elasticity and bending) while the external forces come from the image properties (gradient). The problem is solved by finding an optimum (minimum) of the energy functional. The total energy functional is defined as the following definite integral over the whole range of the parameterized contour $v(s)=v(x(s), y(s))$, where s belongs to $C[0,1]$ $$E^*_v = \int_C E_{ac}(v(s))ds = \int_C E_{in}(v(s)) + E_{ex}(v(s))ds$$

where $E_{in}(v(s))$ represents the internal energy of the active contour due to elasticity and bending, and $E_{ex}(v(s))$ represents the external (image) forces that are applied to the contour. Internal energy is defined as the following two-term sum:

$$E_{in} = (\alpha|v'(s)|^2 + \beta|v''(s)|^2)/2$$

The first-order term, which is controlled by the α coefficient, adjusts the elasticity of the active contour. The second-order term, which is controlled by the β coefficient, adjusts the stiffness of the active contour. In other words, the first part keeps the active contour short (discourages stretching), while the second part keeps it straight (discourages bending).

Given a grayscale image $L(x,y)$, which represents a function of intensity in each (x,y)-position of the image, the image (external) force is chosen to lead an active contour toward the object edges and can be represented by two functionals (see Canny):

$$E_{ex}^{(1)} = -|\nabla L(x,y)|^2$$

$$E_{ex}^{(2)} = -|\nabla[G_\delta(x,y)*L(x,y)]|^2$$

where $G_\delta(x, y)$ is a two-dimensional Gaussian function with standard deviation $\delta$, $\nabla$ is a gradient operator and * denotes the convolution operator. In other words, $E_{ex}^{(2)}$ represents a gradient of the smoothed $L(x, y)$ image.

In the case of the binary image $B(x,y)$ the external forces can be formulated as the following:

$$E_{ex}^{(1)} = \tilde{B}(x,y)$$

$$E_{ex}^{(2)} = G_\delta(x,y) * \tilde{B}(x,y)$$

where $\tilde{B}(x,y)$ represents an inverted binary image.

The parameter $\delta$ controls the smoothness of either the grayscale or the binary image—the larger the $\delta$ parameter, the blurrier the images and their object edges are. The purpose of the parameter $\delta$ is to extend the search range for the optimization of the active contour.

The minimum of $E*v$ can be found using the Euler-Lagrange equation:

$$\alpha v''(s) - \beta v''''(s) - \nabla E_{ex}(v(s)) = 0$$

Let's denote $F_{in} = \alpha v''(s) - \beta v''''(s)$ and $F_{ex} = \nabla E_{ex}(v(s))$, and then the latter equation can be re-formulated as a force balance equation:

$$F_{in} + F_{ex} = 0$$

The $F_{in}$ term represents the internal force that discourages stretching and bending while the external force $F_{ex}$ pulls the active contour toward the desired image edges. Solving the above equation is accomplished with the gradient descent method, which requires converting the active contour $v$ into a function of time $v(s, t)$. Then the partial derivative of $v(s, t)$ with respect to $t$ can be applied to both sides of the Euler-Lagrange equation. After several iterations when the active contour ("snake") has converged to a minimum, its derivative with respect to time becomes zero, and the equation is solved.

$$\partial v(s,t)/\partial t = \alpha v''(s,t) - \beta v''''(s,t) - \nabla E_{ex}(v(s,t))$$

A numerical solution the above equation can be found by discretizing the parameters s and t and solving the equation numerically.

There is a modification of the active contour model where the curve $v$ is defined implicitly as function of a new parameter $r$, i.e., $s = \varphi(r)$. Then the problem can be reformulated in terms of a geodesic form (GAC), which states that the active contour optimization can be expressed as finding a curve of minimal (geodesic) length under the defined constraints. See Caselles, V., Kimmel, R., and Sapiro, G., "Geodesic Active Contours", International Journal of Computer Vision, Vol. 22(1): 61-79, 1997, the disclosure of which is hereby incorporated by reference in its entirety (however, where anything in the incorporated reference contradicts anything stated in the present application, the present application prevails).

Figure 27:
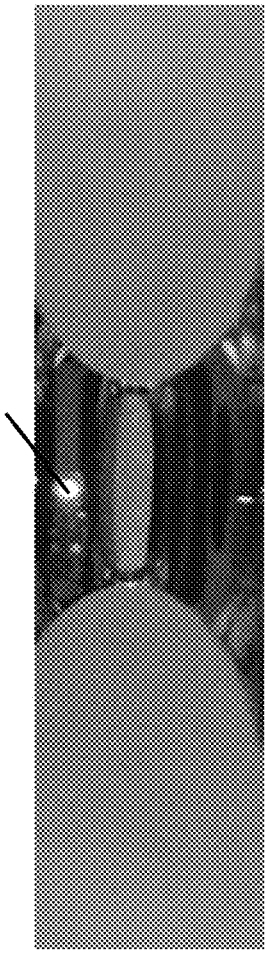
FIG. 27 shows an example of a defect in a liquid column with a distinctive bubble on the top of the image.

In another aspect, the image analysis techniques described below are concerned with detecting inclusions (in the form of bubbles) and scattered light that can affect the spectral measurements. Two parameters can be measured that are found to be useful in combination: a bubble presence score and scattered light intensity. FIG. 27 shows an example of the image with a significant bubble 2710 near the top of the image.

Figure 28:
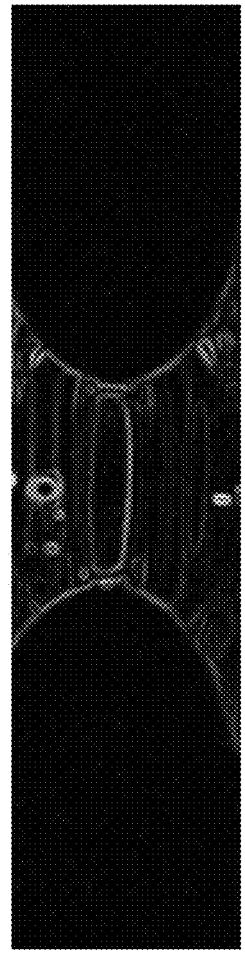
FIG. 28 shows a gradient image of the grayscale image with a bubble on the top that becomes a ring-shaped feature.
Figures 29A, 29B:
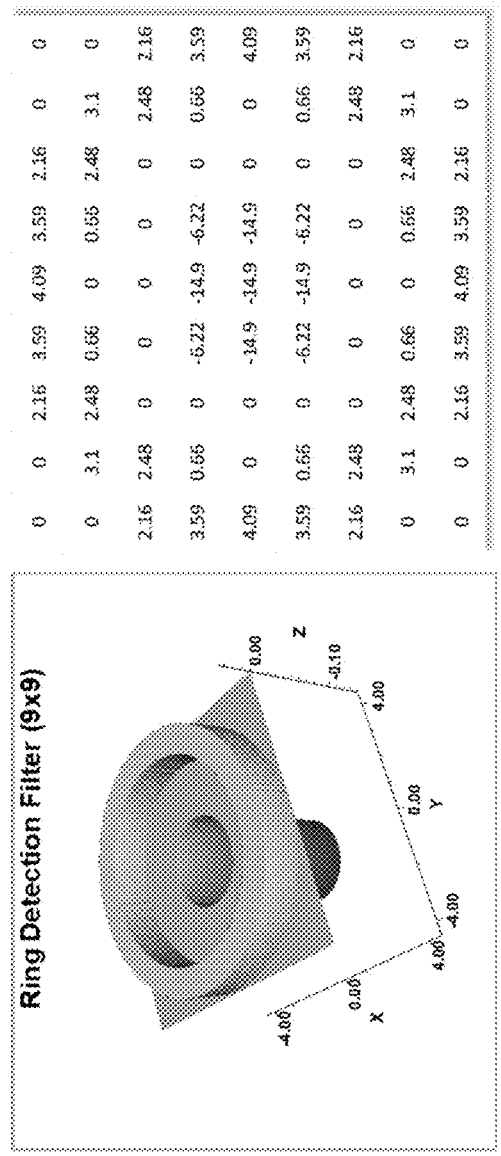
FIGS. 29A-29B illustrate the ring detection filter kernel (size of 9×9 pixels).

An isotropic gradient image of the grayscale component image is used for bubble inclusion detection (see FIG. 28). A special ring detection filter was designed to measure the bubble score. FIGS. 29A and 29B show an example of the ring detection filter with a kernel of 9×9 pixel size. FIG. 29A shows a 3D contiguous representation of the filter while FIG. 29B shows its digital approximation as a 9×9 matrix (for display purposes the matrix values are multiplied by 100). The 3D graph shown in FIG. 29A illustrates a raised circular plateau around its perimeter and a negative circular cavity area in the center. The rest of the kernel is set to the intensity value of 0. Its shape correlates with ring-like features on the isotropic gradient image that enables measuring their intensity score, thereby detecting any bubble in the column of the liquid sample.

Figures 1, 2, 30A, 30B:
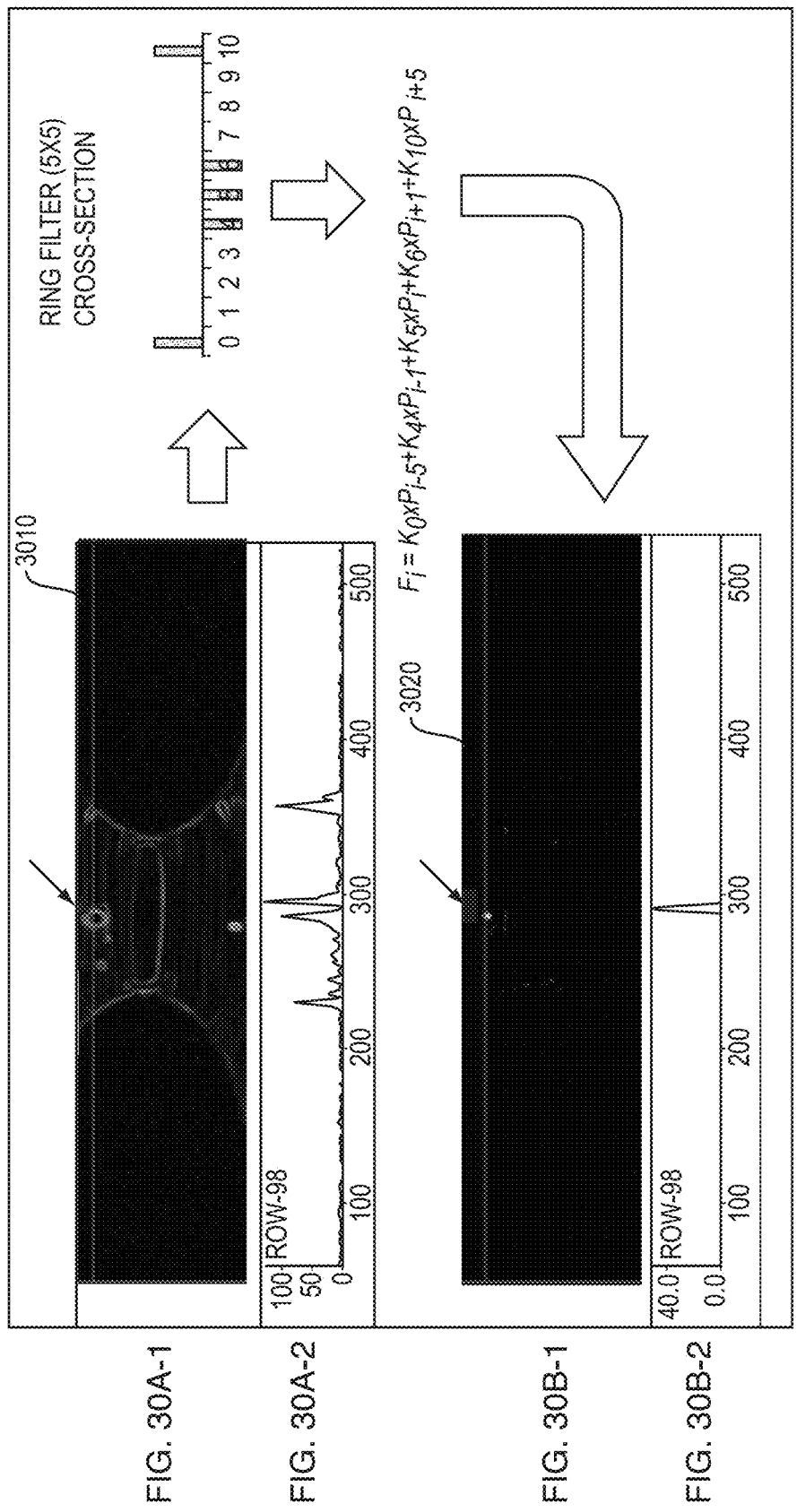

A simplified explanation of the ring detection filter is presented in FIGS. 30A-1 through 30B-2, where the ring filter is applied to a single image row (a grey line 3010 near the top of the image). The gradient image with its row profile (the graph shown in FIG. 30A-2) is shown in FIG. 30A-1. The ring filter (top right) applies to all pixels in the row by using the formula shown below the ring filter, where $K_j$ is a kernel coefficient in kernel position j, $P_i$ is a pixel intensity in row position i and $F_i$ is a result value in position i. The process is applied to all image rows. FIG. 30B-1 shows the resulting image with its cross-section row 3020. Note the result peak shown in FIG. 30B-2 that corresponds to the ring-shape feature on the gradient image (marked with an arrow on top).

The following steps form the ring/bubble presence score calculation algorithm used for detecting any bubble in the column of the liquid sample using both the grayscale component image and the binary image of the light scatter component image:

1. apply successive ring detection filtering to a grayscale isotropic gradient image obtained from the grayscale component image (FIG. 28).

2. accumulate the result into the cumulative image score.

3. use the calculated light path rectangle (2610 obtained in step 24 above, shown in FIG. 26) to limit the ring detection filter application area.

4. start from a minimal ring filter size (3×3) and increase it by 2 (the next is 5×5) and so on up to a predefined maximum filter diameter (15×15, for instance) to cover all possible bubble sizes. While calculating, skip the scores that are below a certain threshold to avoid accumulating values due to noise. The noise threshold is calculated based on statistics of the background rectangular areas for the gradient image (step 810 in FIG. 8B).

Figure 31:
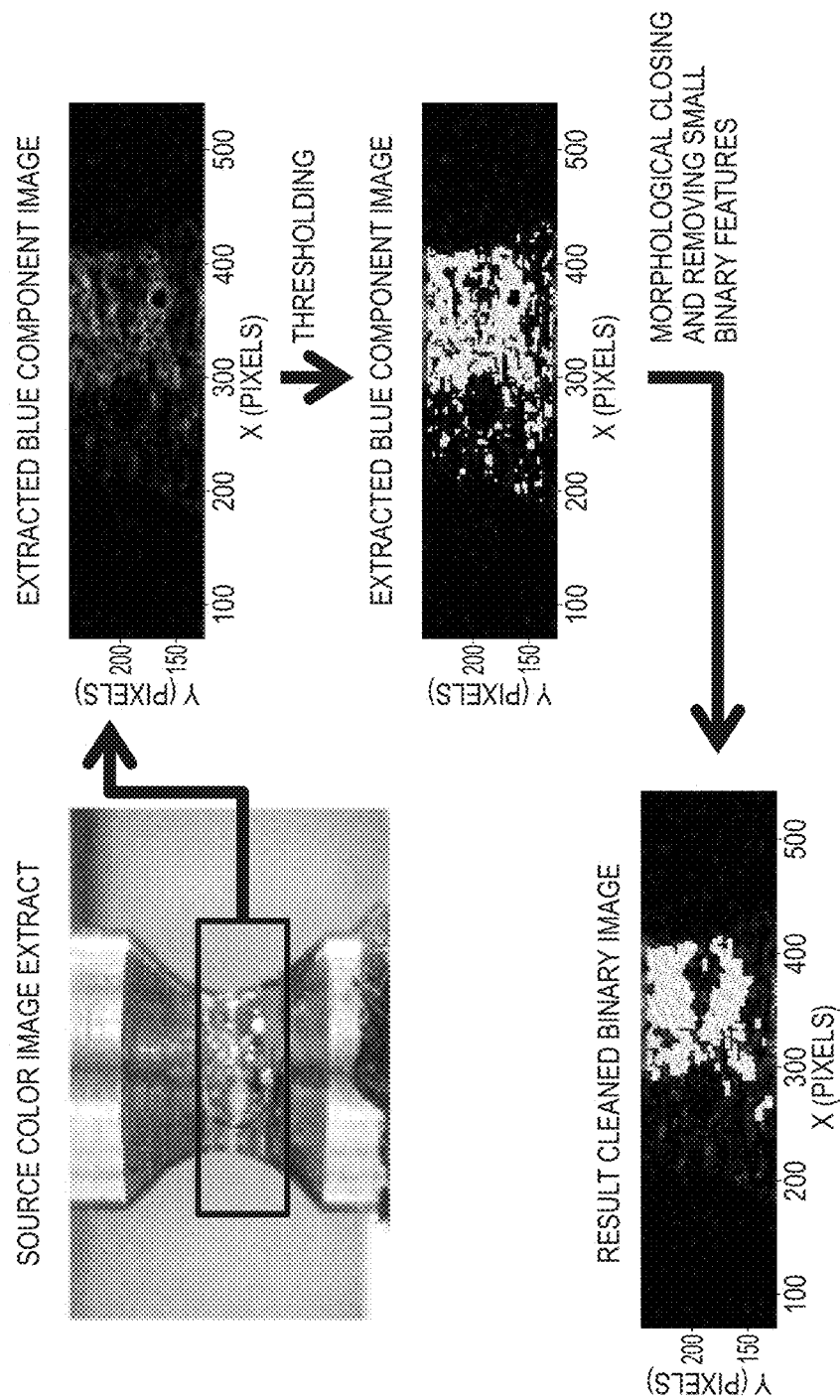
FIG. 31 illustrates obtaining a light scatter binary image from the blue chroma component image. First, the binarization threshold values are calculated using the background area standard deviation and the image gets binarized using the threshold. The resulting binary image is cleared by using the morphological closing filter followed by removing small foreground features.

5. extract the same ROI portion (as that of grayscale component image shown in FIG. 19) from the light scatter component image to estimate the light scatter intensity in the area of the found column shape. FIG. 31 shows a workflow for the light scatter component intensity measurement. Note the noise that is removed and that only bubble scatter is measured.

6. as shown in the workflow in FIG. 31, the light scatter component image is binarized to form a binary light scatter component image using a threshold that is calculated using the calculated standard deviation for the selected background rectangular areas (a zero mean is assumed because no blue color is expected to be present in a normal case). Again, a statistical ±three sigma ($\sigma$) rule is used to set the binarization threshold. Then a morphological closing (morphological filter) is applied followed by a sieve filter for removing small particles. Then the binary foreground and the calculated light path rectangle are used for limiting the area where the blue component intensity pixels are added up. Then the resulting intensity sum is normalized to make it significant for the value of one and higher (step 811 in FIG. 8B).

7. check the bubble presence score and the scattered light intensity score. If both scores are greater that one, then report the defect (steps 812 and 814 in FIG. 8B).

To distinguish a bubble in the optical beam path from a bubble out of the optical beam path, the calculated optical beam center $X_C$ 1840, a theoretical maximum optical beam radius $R_O$ (in one embodiment, $R_O$ is equal to about ½0th of the calculated capital diameter 1110), the column $X_L$ 2620 and $X_R$ 2630 (calculated optical path edges) are used. The calculation area for both the bubble detection filter and the scatter light score is limited to the following: left limit is $\max(X_C-R_O, X_L)$ and the right limit is $\min(X_C+R_O, X_R)$. Limiting the calculation area enables performing the bubble and light scatter score measurement only in the part of the image that is known to distort the spectral measurement.

Figure 36:
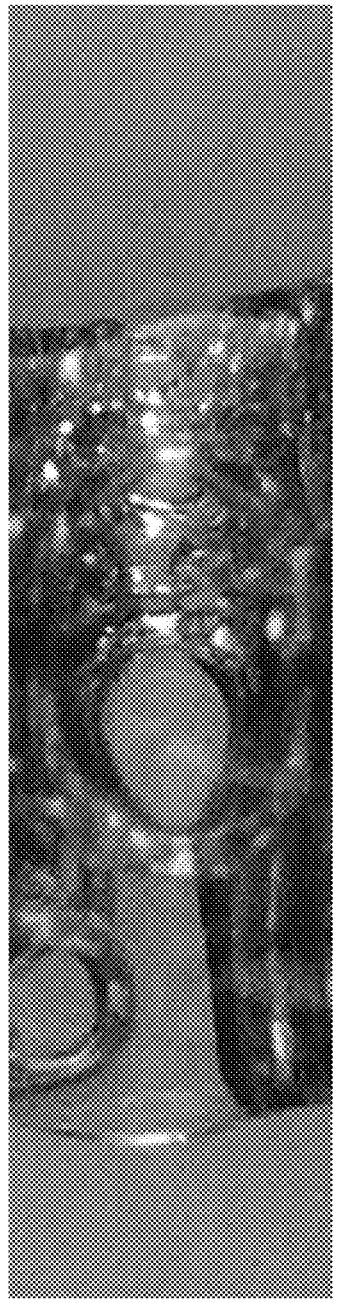
FIG. 36 is an exemplary image of a liquid column with bubbles.

Images of a liquid column with bubbles, as shown in FIG. 36, suggest that bubble edges (contours) represent circular or elliptical shapes. Note that some of the bubbles can be occluded because the image is a 2D (projection) image of a 3D liquid column with bubbles. For circular object finding, the Hough transform can be used as an alternative method of bubble detection. See Filiberto P., "Recognition of Partial Circular Shapes from Segmented Contours", Computer Vision And Image Understanding, Vol. 63(2), 334-342, 1996, the disclosure of which is hereby incorporated by reference in its entirety (however, where anything in the incorporated reference contradicts anything stated in the present application, the present application prevails). Advantages of the transform include its insensitivity to noise and robustness to shape distortion due to occlusion etc.

Let's consider only circular shapes, although the Hough transform can handle elliptical shapes as well. The Hough transform applies to the binarized (thresholded) image of the gradient image or a binary image of the detected bubble edges. For instance, the Canny operator can be used for edge detection and for thresholding it to a binary image.

The standard circle equation has the following form:

$$(x-a)^2+(y-b)^2=r^2,$$

where r is the radius of the circle and (a,b) is a coordinate of the center of the circle.

The Hough transform applies to the digital form of the circle equation, where all parameters are discrete: x and y are indices of a column and row of a matrix of binary (0 or 1) pixels, parameters a and b are also indices (relative positions) of circle centers and r spans through the possible radii of circles that fit into the image and bound to physical objects of interest (bubbles in this case). The radii usually start from a value greater than one, since an approximation of a radius-one circle on the digital image is too rough (it represents a square). Then, every binary edge (contour) pixel $(x_i, y_i)$ can be transformed into an approximation of a circular cone in the 3D (a, b, r) parameter space. If all contour points lie on a circle, then all its correspondent cones will intersect at a single point $(a_i, b_i, r_i)$ corresponding to the parameters of the circle.

Since the space is digital, the cones that satisfy the digital form of the circle equation will not intersect at one pixel, but instead represent a small cluster of pixels with a Gaussian-like density distribution, whose center (most dense value) is the resulting $(a_i, b_i, r_i)$ circle triplet. In order to implement the distribution space, an additional voting (integer) value v is needed and the result of the transformation is a 3D matrix of voting values:

$$V=v(a',b',r'),$$

where a' spans though all image columns, b' spans through all image rows and r' spans through all possible radii of the objects of interest.

The final and most challenging part of the Hough algorithm is finding the points of local maxima in the resulting matrix V (parametric space). Usually, it requires applying an additional filter for the final matrix V. The resulting points of local maxima can be found by applying a threshold to the filtered matrix V, and they represent all possible circular objects. Because of the voting technique, the algorithm works well even for incomplete or noisy images.

For the image analysis summary report shown in Table 1, the following parameters with exemplary values are displayed to the operator of the instrument:

TABLE 1.

| Image analysis report | |
|---|---|
| Off-Center Offset (pixels) | 5 |
| Optical Path Diameter (pixels) | 208 |
| Light Scatter Intensity Score | 21.9 |
| Bubble Presence Score | 36.0 |
| Column Feature Area (pixels) | 25554 |
| Average ROI Pixel Intensity | 148 |
| Column Optical Path Length (pixels) | 119 |

Figure 11:
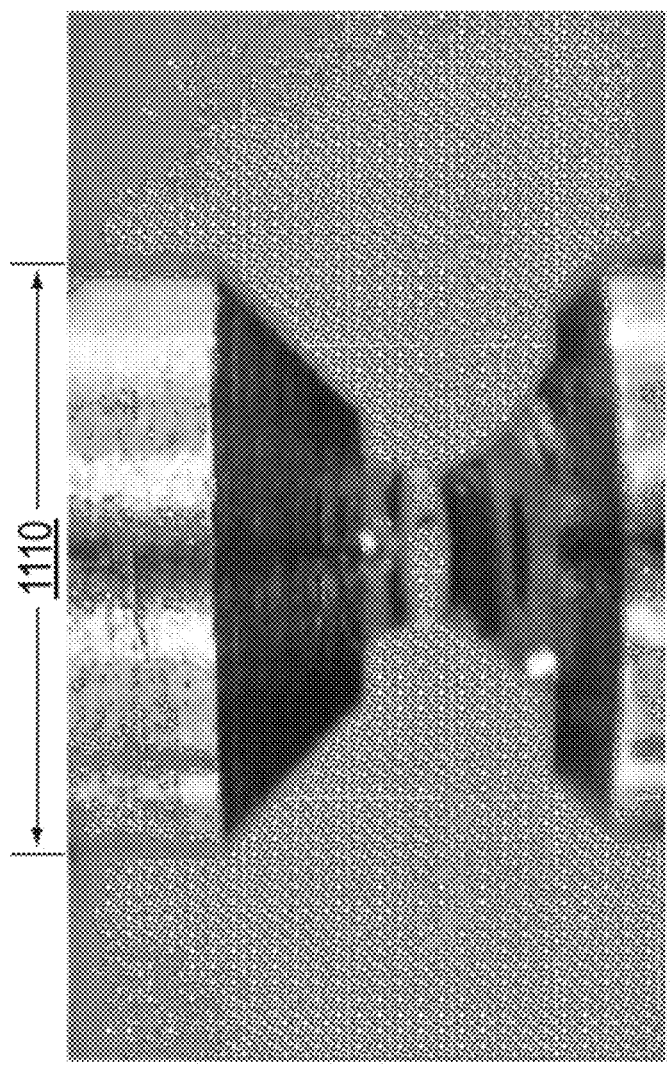
FIG. 11 illustrates the background area on the grayscale image. Background pixels are marked by stippling using the thresholds that match the selected range. Note that background intensity range is underestimated to prevent the features-of-interest from being marked as background.
Figure 12:
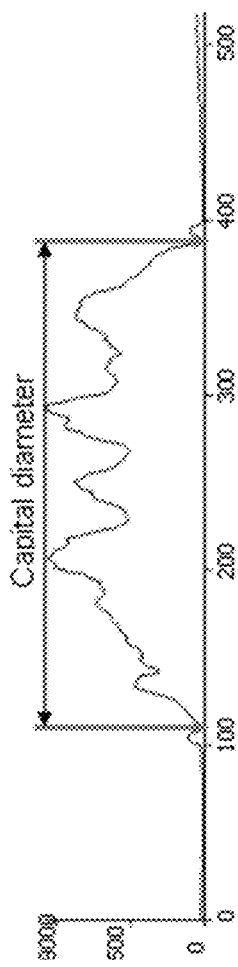
FIG. 12 illustrates how the horizontal part of the ROI with the features gets extracted using the cumulative profile from the grayscale image (FIG. 11). The profile is made by summation of the pixel values for each vertical column of the image. The background value is being subtracted from the pixel values in order to obtain a good ratio between valleys and peaks on the profile plot. The target area represents the raised central plateau in the profile.

Off-center Offset: shows the column shape center offset, in pixels (see FIG. 11). Note that pixels are easy to translate to metric units because the physical dimensions of the capital and pedestal are known. The calculated light path rectangle 2610 shown in FIG. 26 and described in step 24 above is used for the off-center offset calculation.

Optical Path Diameter: the calculated column light/optical path (enclosed cylinder) diameter, in pixels. See step 24 above for details of its calculation.

Light Scatter Score: measured light scatter normalized intensity, in arbitrary fractional units; a value of 1 and greater usually indicates bubble/inclusions defects. The calculation is shown in step 4 of the ring/bubble presence score calculation algorithm above.

Bubble Presence Score: in arbitrary units, a value of more than 1 indicates the presence of bubbles. The bubble presence score is used in combination with light scatter score to identify bubbled (defective) columns. For the parameter calculation details, see step 4 of the ring/bubble presence score calculation algorithm above.

Column Feature Area: measured area of the calculated column shape in pixels.

Column Optical Path Length: measured height of the calculated light path rectangle in pixels, described in step 24 above.

Average ROI Pixel Intensity: average image intensity (between 0 and 255), that is useful for detecting underexposed or overexposed grayscale images and adjusting the binarization thresholds.

Figure 8B:
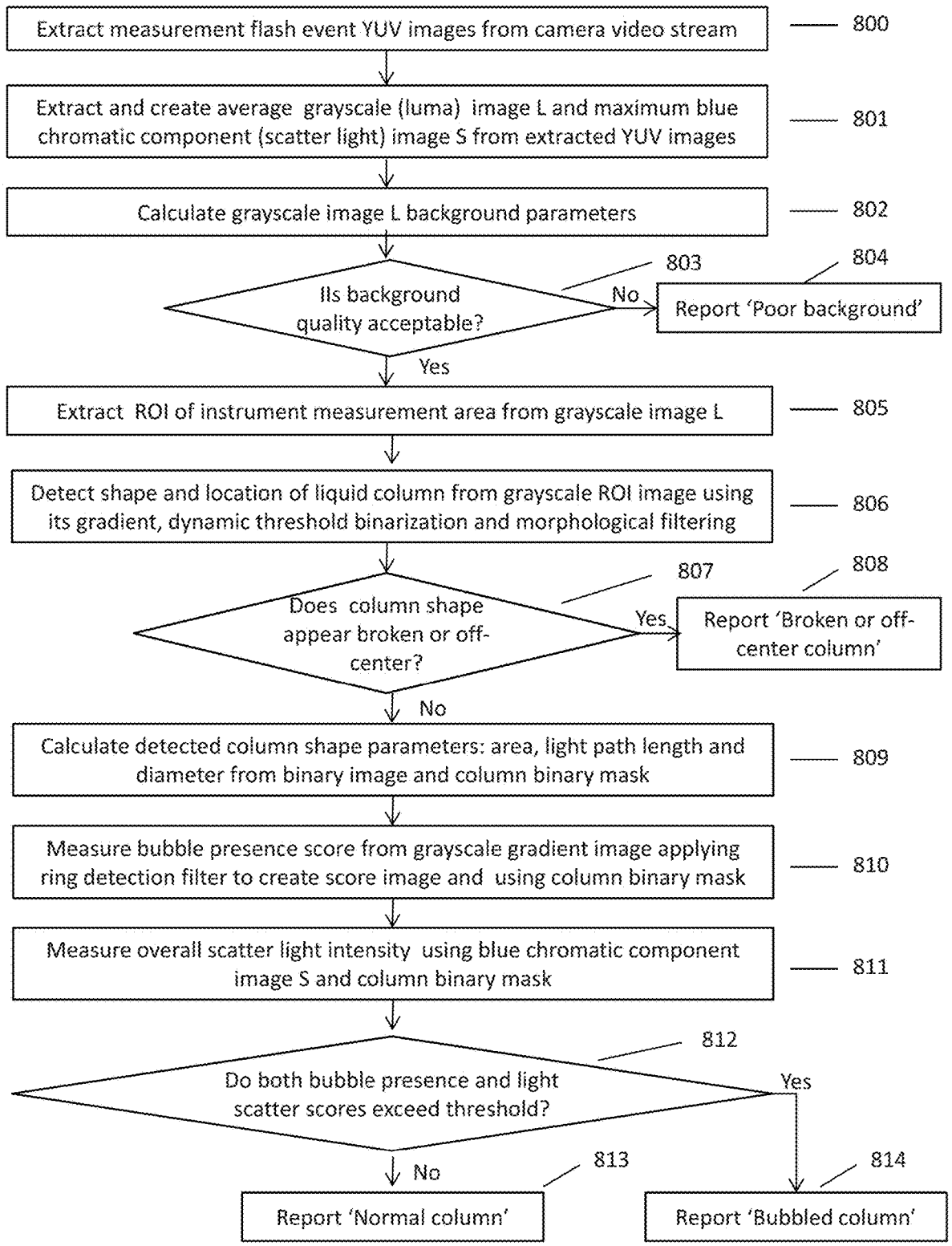
FIG. 8B is a flowchart of the column image analysis method.

The liquid column analysis algorithm produces the following software completion codes:

Undefined: initial value that means either the analysis was interrupted or failed during initial ROI extraction stage (abnormal condition);

OK: normal column, expect good spectral reading (step 813 in FIG. 8B);

Defective column: check the off-center value, the bubble presence score and the light scatter score to identify the reason (step 814 in FIG. 8B);

Empty Compartment: no liquid column was detected (step 808 in FIG. 8B);

Broken Column: no connection between the interface surfaces (step 808 in FIG. 8B);

Column Is Too Short: too short a distance between the interface surface (abnormal condition);

Poor Background: image background quality is too poor for the analysis (abnormal condition) (step 803 in FIG. 8B).

While the invention has been described with reference to exemplary embodiments, it will be understood by those skilled in the art that various changes may be made and equivalents may be substituted for elements thereof without departing from the scope of the invention. In addition, many modifications will be appreciated by those skilled in the art to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A spectrometer including an image analysis system, the system comprising:
    a. a video camera that collects images of a liquid sample disposed between a capital and a pedestal of the spectrometer, the images being collected while a light source shines light through an optical beam path between the capital and the pedestal for photometric or spectrometric measurement; and
    b. a processor adapted to detect any bubble in a column of the liquid sample using the images, wherein the images are YUV color images, and the processor is further adapted to i) obtain from the YUV color images a grayscale component image and a light scatter component image, and ii) obtain at least one binary image of the grayscale component image and at least one binary image of the light scatter component image.

2. The image analysis system of claim 1, wherein the at least one binary image of the grayscale component image includes a first binary image of the grayscale component image obtained from applying an upper dynamic threshold and a lower dynamic threshold obtained from an interpolation between left and right background variation thresholds in the grayscale component image.

3. The image analysis system of claim 2, wherein the at least one binary image of the grayscale component image includes a second binary image of a grayscale isotropic gradient image, the grayscale isotropic gradient image obtained using the grayscale component image and a static threshold based on isotropic gradient image background noise statistics.

4. The image analysis system of claim 3, wherein the at least one binary image of the grayscale component image includes a composite binary image obtained from a combination of the first and second binary images.

5. The image analysis system of claim 4, wherein the processor is further adapted to detect location of the column of the liquid sample and location of the optical beam path from the composite binary image.

6. The image analysis system of claim 5, wherein the processor is further adapted to detect any bubble in the column of the liquid sample using both the grayscale component image and the at least one binary image of the light scatter component image.

7. The image analysis system of claim 6, wherein using the grayscale component image includes applying a ring detection filter to a grayscale isotropic gradient image obtained from the grayscale component image.

8. The image analysis system of claim 6, wherein using the at least one binary light scatter component image includes applying a morphological filter to the at least one binary image of the light scatter component image.

9. The image analysis system of claim 6, wherein the processor is further adapted to distinguish a bubble in the optical beam path from a bubble out of the optical beam path using the grayscale component image, the at least one binary image of the light scatter component image, and the calculated location of the optical beam path.

10. A method of analyzing an image, the method comprising:
    a. collecting YUV color images of a liquid sample disposed between a capital and a pedestal of a spectrometer, the YUV color images being collected while a light source shines light through an optical beam path between the capital and the pedestal for photometric or spectrometric measurement;
    b. obtaining from the YUV color images a grayscale component image and a light scatter component image, and obtaining at least one binary image of the grayscale component image and at least one binary image of the light scatter component image;
    c. detecting location of a column of the liquid sample and location of the optical beam path from the images;
    d. detecting any bubble in the column of the liquid sample using the images; and
    e. reporting an image analysis summary to a display.

11. The method of analyzing an image of claim 10, wherein the at least one binary image of the grayscale component image includes a first binary image of the grayscale component image obtained from applying an upper dynamic threshold and a lower dynamic threshold obtained from an interpolation between left and right background variation thresholds in the grayscale component image.

12. The method of analyzing an image of claim 11, wherein the at least one binary image of the grayscale component image includes a second binary image of a grayscale isotropic gradient image, the grayscale isotropic gradient image obtained using the grayscale component image and a static threshold based on isotropic gradient image background noise statistics.

13. The method of analyzing an image of claim 12, wherein the at least one binary image of the grayscale component image includes a composite binary image obtained from a combination of the first and second binary images.

14. The method of analyzing an image of claim 13, further including detecting location of a column of the liquid sample and location of the optical beam path from the composite binary image.

15. The method of analyzing an image of claim 14, wherein detecting any bubble in the column of the liquid sample includes using both the grayscale component image and the at least one binary image of the light scatter component image.

16. The method of analyzing an image of claim 15, wherein using the grayscale component image includes applying a ring detection filter to a grayscale isotropic gradient image obtained from the grayscale component image.

17. The method of analyzing an image of claim 15, wherein using the at least one binary light scatter component image includes applying a morphological filter to the at least one binary image of the light scatter component image.

18. The method of analyzing an image of claim 15, further including distinguishing a bubble in the optical beam path from a bubble out of the optical beam path using the grayscale component image, the at least one binary image of the light scatter component image, and the calculated location of the optical beam path.

\* \* \* \* \*